US00RE41049E

(19) United States
(12) Reissued Patent
Yang

(10) Patent Number: US RE41,049 E
(45) Date of Reissued Patent: Dec. 22, 2009

(54) CHARGING DEVICE WITH STRESS STORED BY CHARGING THAT IS INITIATED BY EXTERNALLY APPLIED FORCE, AND THAT BEING EVENTUALLY RELEASED BY HEAT DUE TO CHARGING SATURATION

(76) Inventor: Tai-Her Yang, 6F-5 No. 250, Sec. 4, Chung Hsiao E. Rd., Taipei (TW)

(21) Appl. No.: 11/145,506
(22) Filed: Jun. 6, 2005

Related U.S. Patent Documents

Reissue of:
(64) Patent No.: 6,819,082
Issued: Nov. 16, 2004
Appl. No.: 10/440,086
Filed: May 19, 2003

U.S. Applications:
(63) Continuation of application No. 10/260,283, filed on Oct. 1, 2002, now abandoned.

(51) Int. Cl.
*H02J 7/00* (2006.01)

(52) U.S. Cl. ..... 320/112; 320/107; 320/154
(58) Field of Classification Search ..... 320/106, 320/107, 110, 112, 113, 114, 115, 153, 154; 429/96, 97, 98, 99, 100
See application file for complete search history.

(56) References Cited

U.S. PATENT DOCUMENTS

| | | | | | |
|---|---|---|---|---|---|
| 3,928,792 | A | * | 12/1975 | Mullersman et al. | 320/154 |
| 4,360,338 | A | * | 11/1982 | Katchka | 431/46 |
| 5,722,242 | A | * | 3/1998 | Edelson | 62/3.1 |
| 5,844,465 | A | * | 12/1998 | Armenio et al. | 337/377 |
| 6,127,913 | A | * | 10/2000 | Niino et al. | 337/343 |
| 6,652,115 | B2 | * | 11/2003 | Sharrah | 362/183 |
| 2002/0101220 | A1 | * | 8/2002 | Yang | 320/150 |

* cited by examiner

*Primary Examiner*—Akm E Ullah
*Assistant Examiner*—M'Baye Diao
(74) *Attorney, Agent, or Firm*—Bacon & Thomas, PLLC

(57) ABSTRACT

A secondary cell featuring a transient rise in temperature once charged to saturation is coupled and thereby forms a composite structure with a charging assembly by mutual engagement of conductive contacts provided on either part. The force of union generated by the coupling compresses a thermosetting prestressed means which is a spring or other prestressed element the coupling brings the contacts into conduction to initiate charging. The stress is released once charging in the secondary cell reaches its saturation, followed by cutoff of the charging current to the secondary cell.

20 Claims, 19 Drawing Sheets

AMENDED

AMENDED

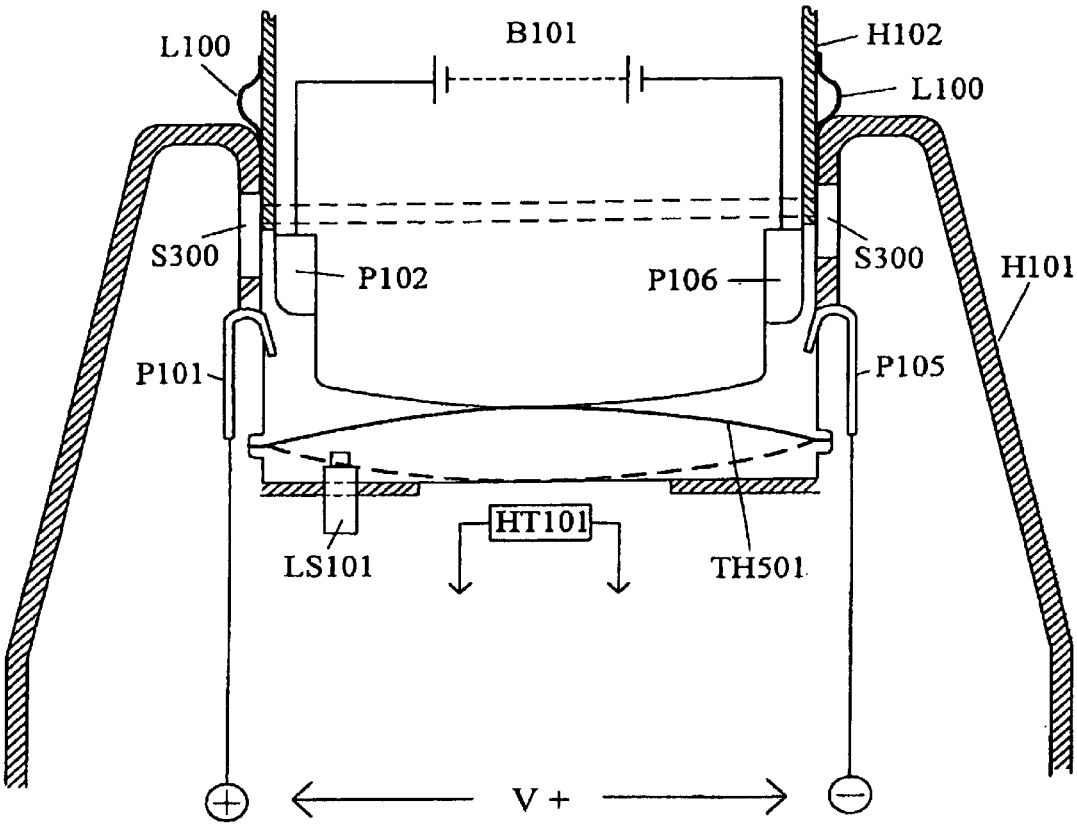
FIG. 19
AMENDED

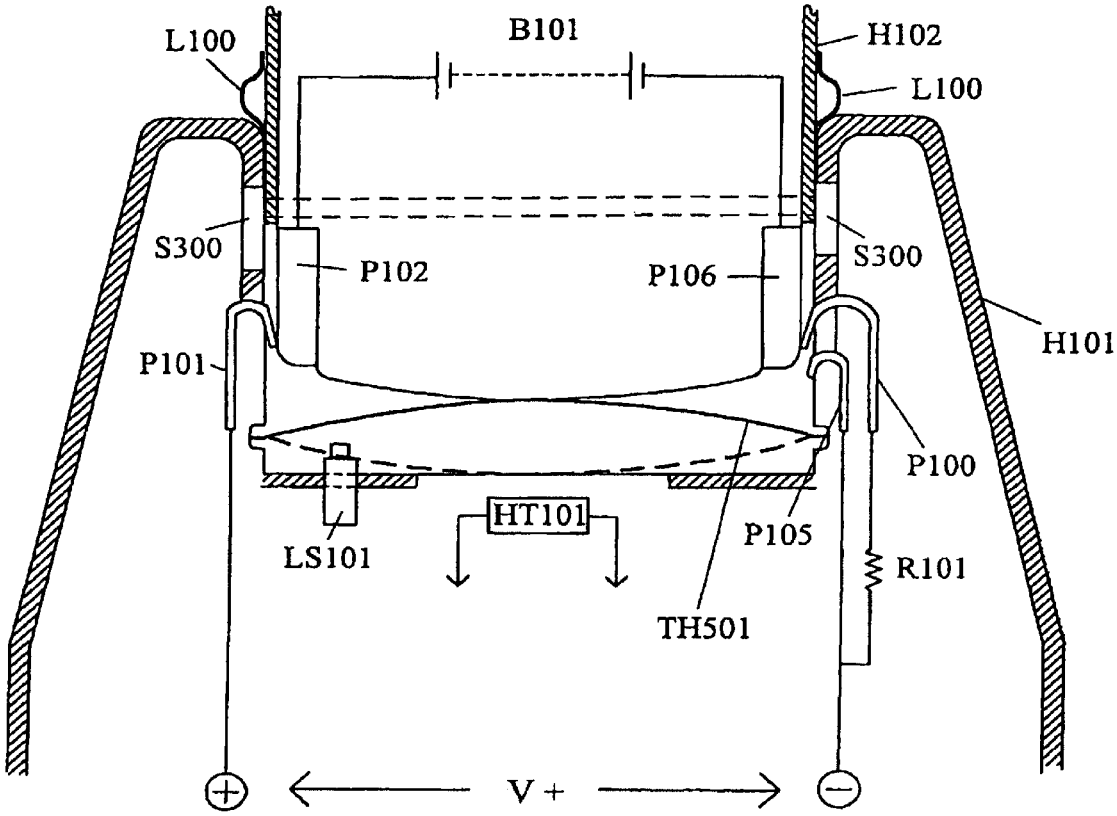
FIG. 20
AMENDED

CHARGING DEVICE WITH STRESS STORED BY CHARGING THAT IS INITIATED BY EXTERNALLY APPLIED FORCE, AND THAT BEING EVENTUALLY RELEASED BY HEAT DUE TO CHARGING SATURATION

Matter enclosed in heavy brackets [ ] appears in the original patent but forms no part of this reissue specification; matter printed in italics indicates the additions made by reissue.

This application is a Continuation nonprovisional application Ser. No. 10/260/283 filed Oct. 1, 2002, now abandoned.

BACKGROUND OF THE INVENTION

Due to the booming development in hand-held or portable electric appliances or utilities, secondary rechargeable batteries or cells are finding ever more extensive applications from day to day. The present invention relates to a charging assembly and a secondary battery set, such as, for example, a nickel/cadmium, a nickel/hydrogen, a nickel/zinc, or a ferrous nickel cell, to be mounted in and matched with the charging assembly, the charging assembly and secondary battery set being furnished with conductive contacts to facilitate transfer of electric power from the charging assembly to the second battery set. The conductive contacts are arranged such that, once force is applied thereto in order to insert the secondary battery set into the charging assembly, a spring will be mechanically compressed to store stress, the spring being arranged to disengage the contacts when a transient temperature rises in response to charging saturation, i.e., after the contacts are brought into conduction to initiate a charging cycle, stress stored in the spring will be released by control of a temperature-responsive saturation testing device and an interface matched thereto. Cutoff of the secondary cell from the charging assembly may be made with respect only to the secondary battery cell, only to the charging assembly, or only to conductive contacts inside the charging assembly, so that charging current in the secondary cell is cut off altogether. The saturation testing device includes a temperature sensor arranged to test the rise in temperature when the cell charging reaches its saturation, and to thereby determine the timing to cut off charging once saturation is reached. Alternatively, a temperature testing means may be provided with conductive contacts in the charging assembly, so that the batter cell is secured in place when inserted into the charging assembly and a stable conduction is made between the entire charging assembly and the cell, so that charging may occur with respect to the cell, the temperature sensor being maintained in a set status until saturation occurs in the cell that is being charged, at which time the cell undergoes a rise in temperature and the temperature sensor responds by driving the charging assembly and the cell into a cutoff status in which the power supply to the secondary cell is cut off and charging current is blocked accordingly.

SUMMARY OF THE INVENTION

The present invention relates to the combination of a charging assembly and a secondary battery cell set characterized by a transient temperature rise when charged to saturation, both parts being furnished with conductive contacts to transfer power therebetween. The contacts are prestressed by the force applied to a spring when the conductive contacts are caused to engage and thereby brought into conduction so as to initiate a charging cycle. When the secondary cell reaches saturation, heat will intervene to release the prestressed state, causing the conductive contacts on both the secondary cell set and the charging assembly to be pushed apart, causing charging of the secondary cell to be cut off altogether.

BRIEF DESCRIPTION OF THE DRAWINGS

FIG. 19 shows an eleventh embodiment of the invention in which the temperature sensor is executed in the form of a memory alloy or a thermosetting binary metal, installed between the secondary cell set and the charging assembly;

FIG. 20 shows a twelfth embodiment of the invention;

DETAILED DESCRIPTION OF THE PREFERRED EMBODIMENTS

Figure 1:
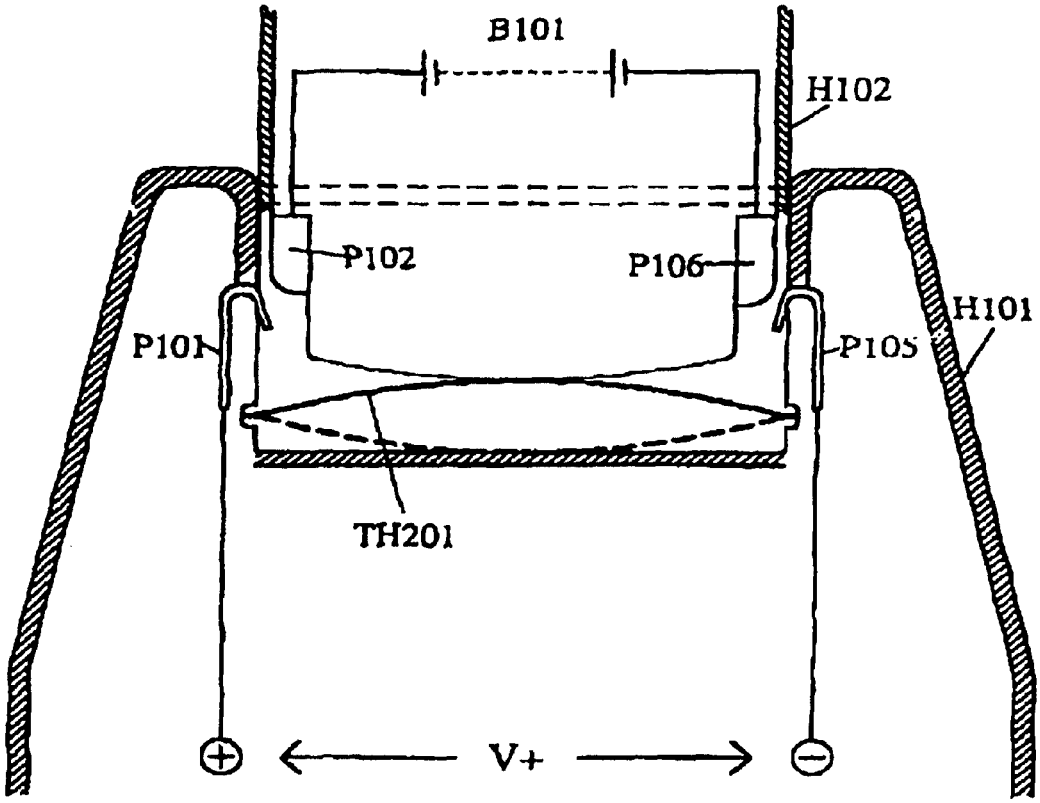
FIG. 1 shows a first embodiment of the invention in which in which the temperature sensor is executed in the form of a thermo-resetting flip-flop metal spring interposed between the secondary cell and the charging assembly.

As covered by the present invention, the cell charging saturation testing device can include any of a variety of temperature sensors, with the charging assembly and the secondary battery cell set being couple in a vertically upwards direction and uncoupled downwards, or alternatively coupled downwardly and uncoupled upwardly in a vertical direction; or coupled and uncoupled horizontally; or coupled and uncoupled in an angular setting relative to each other, and in which the prestressed thermosetting means comprises any of the following:

1. Thermosetting flip-flop binary metal spring sheets;
2. A thermosetting flip-flop binary metal retainer and spring;
3. A resilient positioning mortise joint and dovetail coupling provided on both the charging assembly and the secondary battery cell set to localize charging operation, and complemented with a thermo-setting memory alloy or binary metal structure to be deformed by heat expression once charging taking place in the secondary cell set has reached its saturation, at which time conductive contacts binding the secondary cell set with the charging assembly are brought apart, including alternatively disengaging contacts solely in the secondary cell set, solely in the charging assembly, or within the charging assembly, so that the power supply is blocked forthwith;
4. Conductive contacts on the charging assembly and conductive contacts on the secondary cell set retained resiliently in position with respect to each other, forming thereby a pair, and having thermosetting memory alloy or binary metal sheets, or annular spring units arranged on the secondary cell set once the cell set is loaded in place, so that a secured attachment is made, and so that thermal deformation which occurs when the secondary cell set is charged to saturation will bring the secondary cell set and the charging assembly apart from each other by disengagement of the pair of contacts in the secondary cell set, in the charging assembly, or within the charging assembly, so that the power supply is blocked forthwith;

5. A thermosetting memory alloy or binary metal processed into conductive contacts for the charging assembly, which, in addition to getting coupled to conductive contacts on for coupling to the secondary cell set, also hold the secondary cell set in position so that, on being heated by saturation of the secondary cell set, will deform to release hold of the secondary cell set, causing the secondary cell set to fall straight off the conductive contacts of the charging assembly and thereby cut-off the power supply;

6. Shape memory alloy or binary metal contacts transformed by heat, together with another set of contacts functioning as a prestress spring coupled to the conductive contacts on the secondary cell set, to hold in place the secondary cell so that when the conductive contacts on the charging assembly receive heat from the effect of saturation of the secondary cell set, they become deformed to release hold of the secondary cell set, the interactive coupling of contacts between the secondary cell set and the charging assembly being released by the prestressed conductive contact functioning like a prestressed spring, or alternatively released to cut-off the power supply by prestressed spring action with respect to the secondary cell set only, the charging assembly only, or internal contacts of the charging assembly only, it is to be understood that both sets of conductive contacts of the charging assembly may feature thermosetting or prestressed spring traits.

Structured accordingly, when the secondary cell is loaded into the charging assembly, force applied externally will compel the cell to bring contacts on both the charging assembly and the cell into conductive coupling, whereupon charging to the cell begins, which in turn brings the Battery Charging Saturation Testing Device to a testing state. Once the cell is charged to saturation, then both the Charging Saturation Testing Device and the interfacing matched thereby will respond to reset both the charging assembly and the cell set to a released, that is, open state, and power supply to the secondary cell set is blocked forthwith.

A first embodiment of the invention in which the temperature sensor is in the form of a thermo-resetting flip-flop binary metal spring interposed between the secondary cell set and the charging assembly is illustrated in FIG. 1. When the secondary cell set H102 and the charging assembly H101 are coupled together, the force of union occasioned thereby will compel the thermo-resetting flip-flop binary metal spring TH201 to revert to a pre-stressed state so that contacts P102, P106 on the secondary cell set H102 and contacts P101, P105 on the charging assembly H101 are brought into conductive engagement, thereby enabling the charging power from the charging assembly H101 to charge the secondary cell set H102. When charging of the secondary cell B101 reaches its saturation, accompanied by a rising of temperature to a predetermined level, the thermo-resetting flip-flop, i.e., bistable, binary metal spring TH201 interposed between the secondary cell set H102 and the charging assembly H101 will reset thermally to release its stored prestress, thus disengaging corresponding contacts on the secondary cell set and on the charging assembly. The action of binary metal spring TH201 may of course be arranged to only affect the contacts on the secondary cell set, on the charging assembly, or within the charging assembly. Charging current to the secondary cell B101 is thereby cut off. This embodiment comprises essentially:

Charging assembly H101, in plane or dovetail coupling with the secondary cell set H102, and including a built-in D.C. power supply circuit and conductive contacts P101, P105 for coupling with counterparts P102 and P106 on the secondary cell;

A D.C. power supply made up of a D.C. system or one converted from an A.C. system through rectification, and serving to charge the secondary cell by way of a charging circuit;

Secondary cell set H102, enclosed in an insulation casing and incorporating a secondary cell B101 and conductive contacts P102, P106 in line with the positive/negative terminals of-the secondary cell B101; the interface between the secondary cell H102 and the charging assembly H101 being provided with a thermo-resetting flip-flop binary metal spring TH201;

Thermo-resetting binary flip-flop metal spring TH201 comprising one or more pieces superposed in a same or opposite functional direction and interposed at the interface between the charging assembly H101 and the secondary cell set H102 to convert the force applied on both when combined into stored stress to be released whenever the thermo-resetting flip-flop binary metal spring TH201 resets itself due to heat resulting from a rise in temperature due to charging of the secondary cell B101 to saturation, at which point corresponding contacts on both the secondary cell set and on the charging assembly are released.

Figure 2:
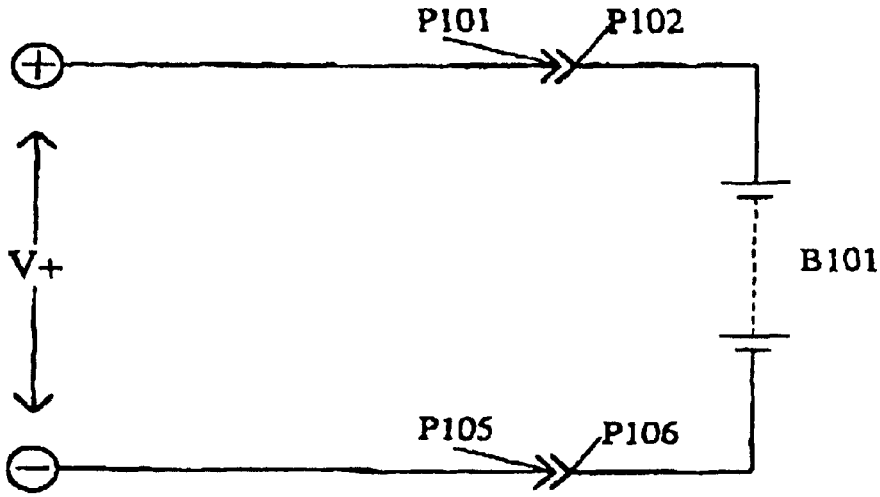
FIG. 2 is a circuit diagram for the embodiment of FIG. 1.

A circuit diagram for the example illustrated in FIG. 1 is given in FIG. 2, wherein the power to charge the secondary cell set is D.C. by way of the conductive contacts common on both the charging assembly and the secondary cell set.

Figure 3:
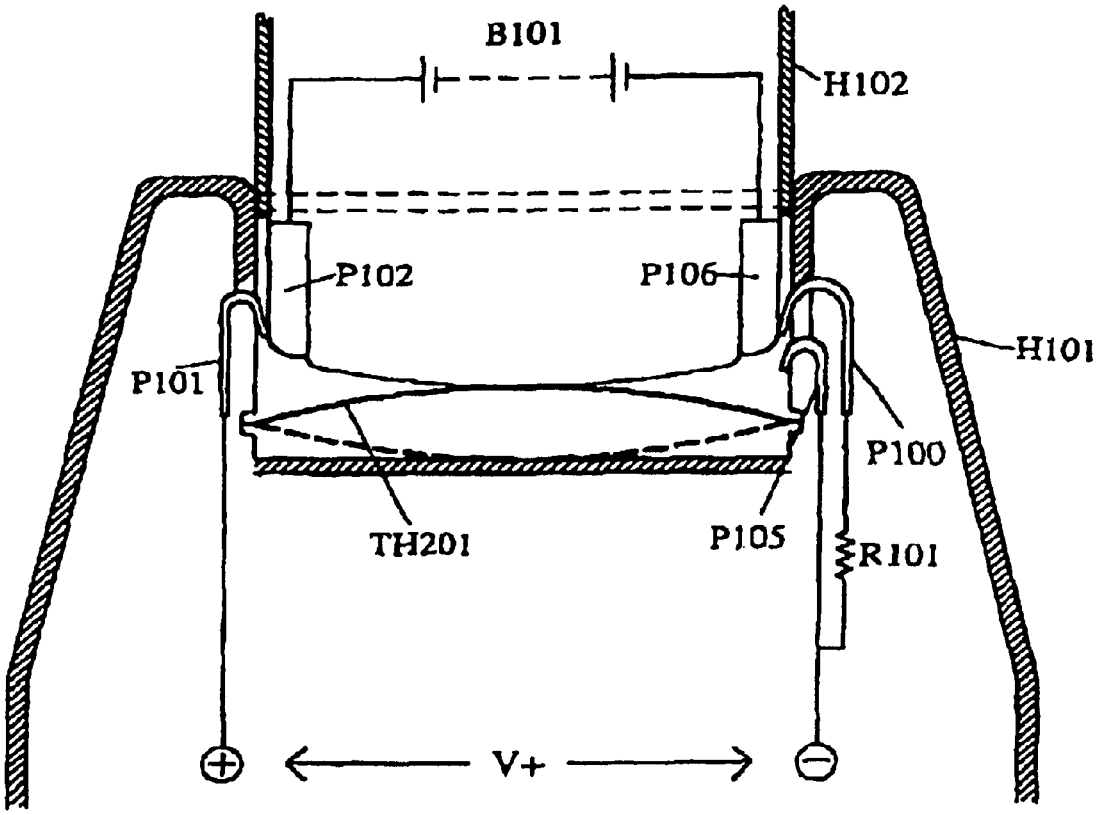
FIG. 3 shows a second embodiment of the invention.

A second embodiment of the invention is illustrated in FIG. 3, which is in fact a modification of the embodiment of FIG. 1. In this embodiment, an auxiliary contact P100 is added to the charging assembly H101, to release the prestress stored in the thermo-resetting flip-flop binary metal spring TH201 when it is reset by the heat which results from a rise in temperature as charging of the secondary cell B101 reaches saturation, so as to release the coupling of contacts on both the secondary cell set and the charging assembly so that charging current to the secondary cell B101 is blocked forthwith even though conduction is still maintained way between the contacts P101 on the charging assembly H101 and contacts P102 on the secondary cell set H102. As a result of the addition of an auxiliary contact P100 which is in series with a current limiting resistor R101 with the power supply, conduction is made with the contact P106 on the secondary cell set H102, thereby maintaining a small charging current from the power supply to the secondary cell.

Figure 4:
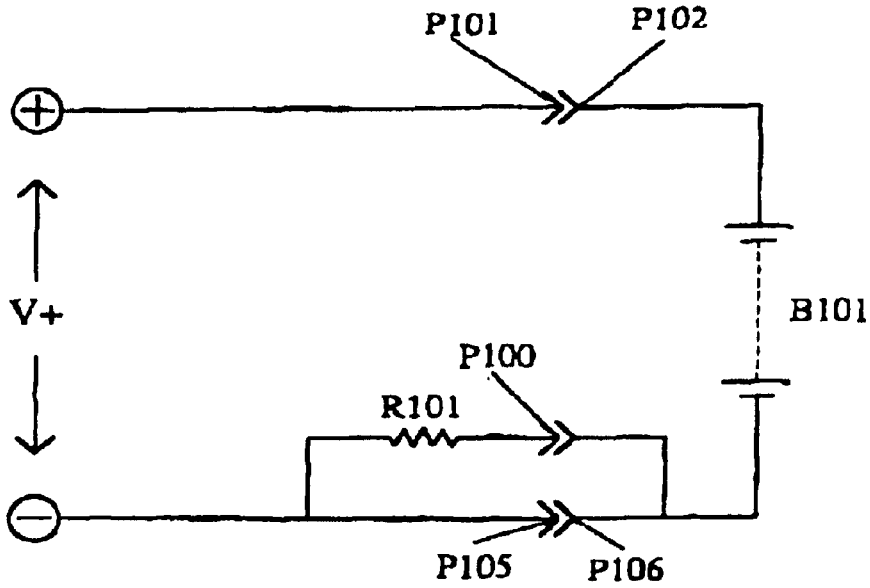
FIG. 4 is a circuit diagram for the embodiment of, FIG. 3.
Figure 5:
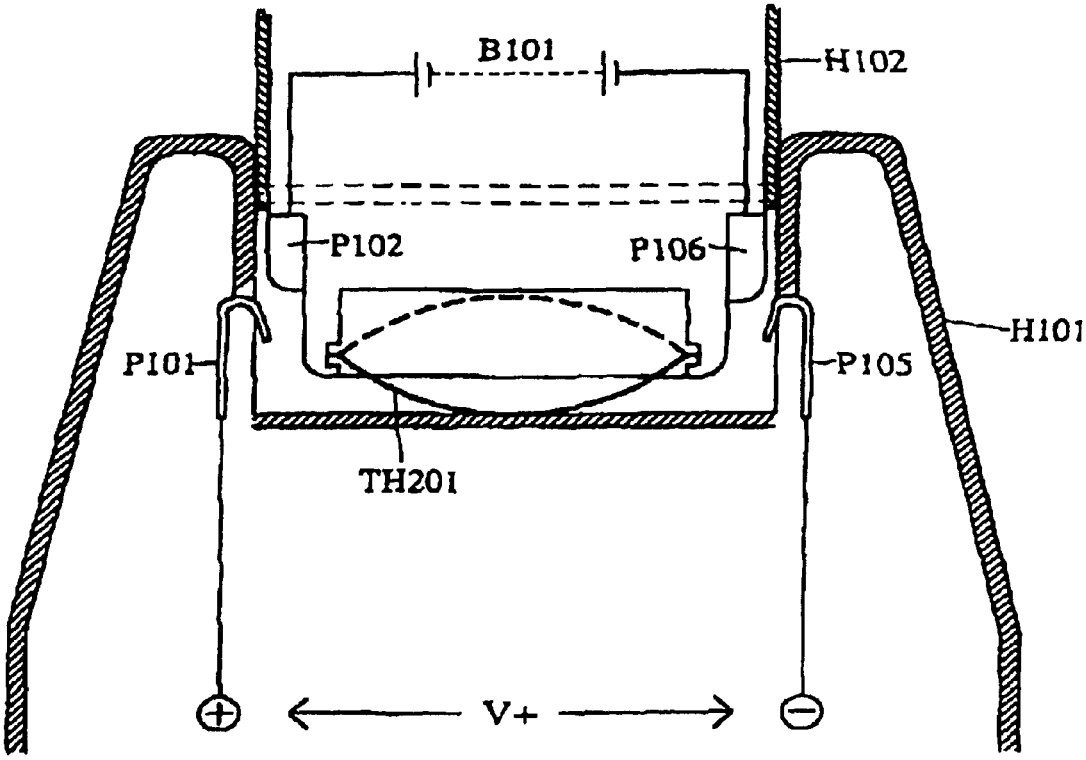
FIG. 5 shows a third embodiment of the invention in which the temperature sensor is executed in the form of a thermo-resetting flip-flop metal spring interposed between the secondary cell and the charging assembly.

A circuit diagram of the embodiment of FIG. 3 is given in FIG. 4.

third embodiment of the invention in which the temperature sensor is executed in the form of a thermo-resetting binary flip-flop metal spring between the secondary cell and the charging assembly is illustrated in FIG. 5. When the secondary cell set H102 and the charging assembly H101 are coupled together, the force of union occasioned thereby will compel the thermo-resetting flip-flop binary metal spring TH201 to revert to a prestressed state so that contacts P102, P016 on the secondary cell set H102 and contacts P101, P105 on the charging assembly H101 are brought conductively altogether, thereby enabling the charging power from the charging assembly H101 to charge the secondary cell set H102. When charging of the secondary cell B101 reaches saturation due to a rise in temperature to a predetermined level, the thermo-resetting flip-flop binary metal spring TH201 interposed between the secondary cell set and the charging assembly H101 will reset thermally to release its stored prestress, thus disengaging corresponding contacts on the secondary cell set and on the charging assembly and thereby blocking charging current to the secondary cell B101. This embodiment comprises essentially the same elements as described in connection with FIG. 1, except that the binary metal spring TH201 is installed in the secondary cell set H102.

Figure 6:
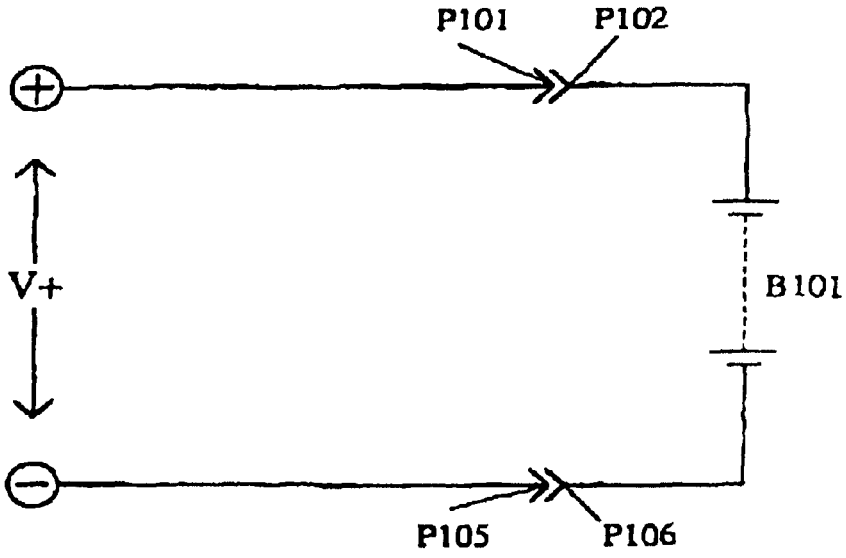
FIG. 6 is a circuit diagram for the embodiment of FIG. 5.

A circuit diagram for the embodiment of FIG. 5 is given in FIG. 6.

Figure 7:
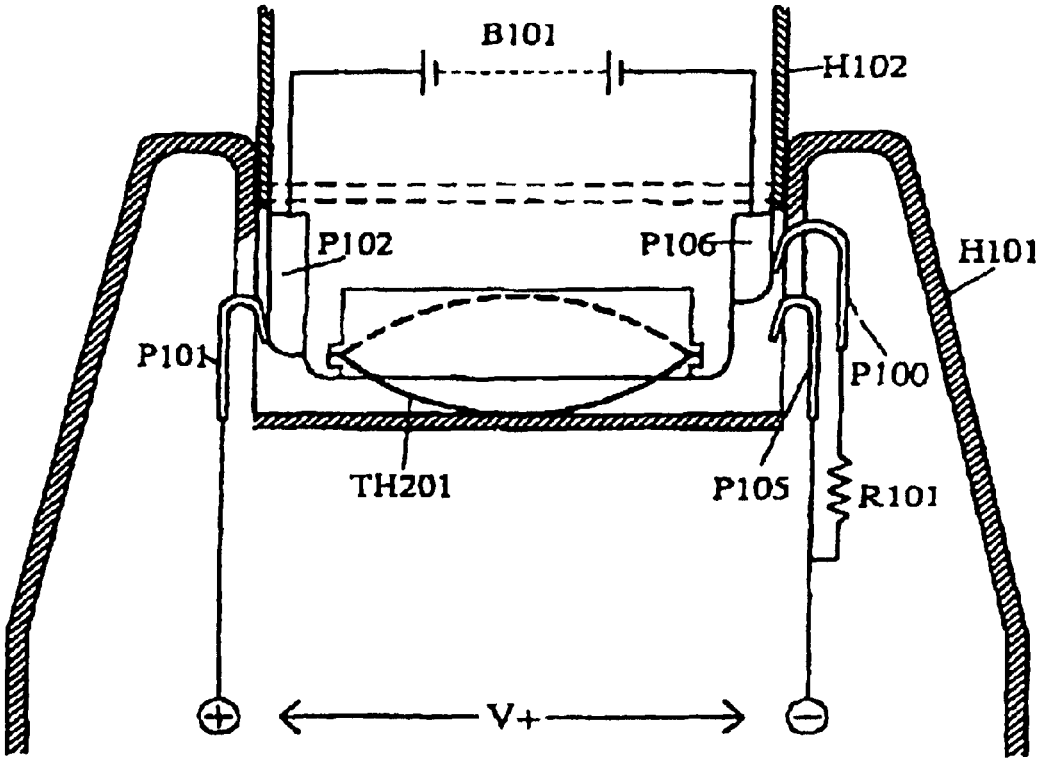
FIG. 7 shows a fourth embodiment of the invention.

A fourth embodiment of the invention is illustrated in FIG. 7, which is in fact a modification of the embodiment of FIG. 5. This embodiment is distinguished by the addition of an auxiliary conductive contact P100, corresponding to the auxiliary conductive contact shown in FIG. 3, to the charging assembly H101, to release the prestress stored in the thermo-resetting flip-flop binary metal spring TH201 when it is reset by the heat which results from a rise in temperature as charging of the secondary cell B101 reaches saturation, so as to release the coupling of contacts on both the secondary cell set and the charging assembly so that the main charging current to the secondary cell B101 is blocked forthwith while still maintaining conduction between the contacts P101 on the charging assembly H101 and the contacts P102 on the secondary cell set H102. By the addition of auxiliary contact P100 which is in series with a current limiting resistor R101 with the power supply, conduction is made with the contact P106 on the secondary cell set H102, thereby maintaining a small charging current as from the power supply to the secondary cell.

Figure 8:
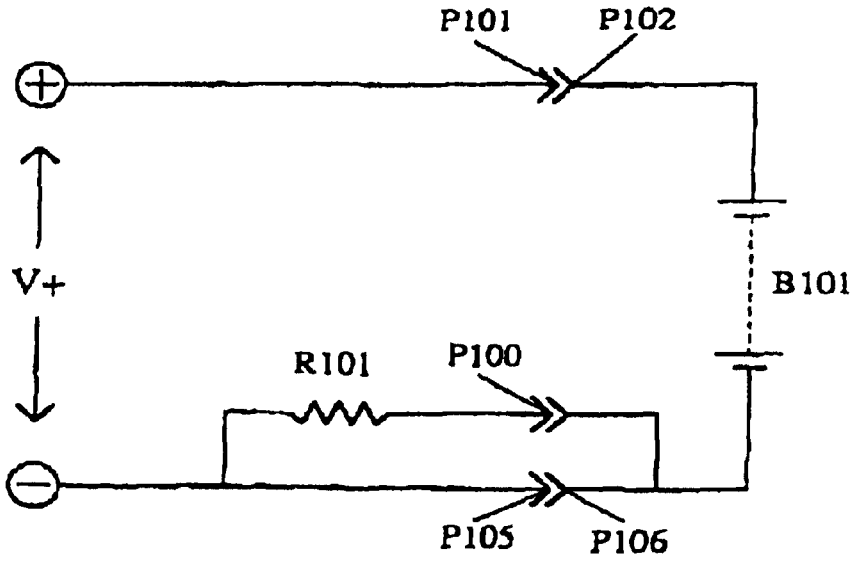
FIG. 8 is a circuit diagram for the embodiment of FIG. 7.

A circuit diagram for the embodiment of FIG. 7 is given in FIG. 8.

Figure 9:
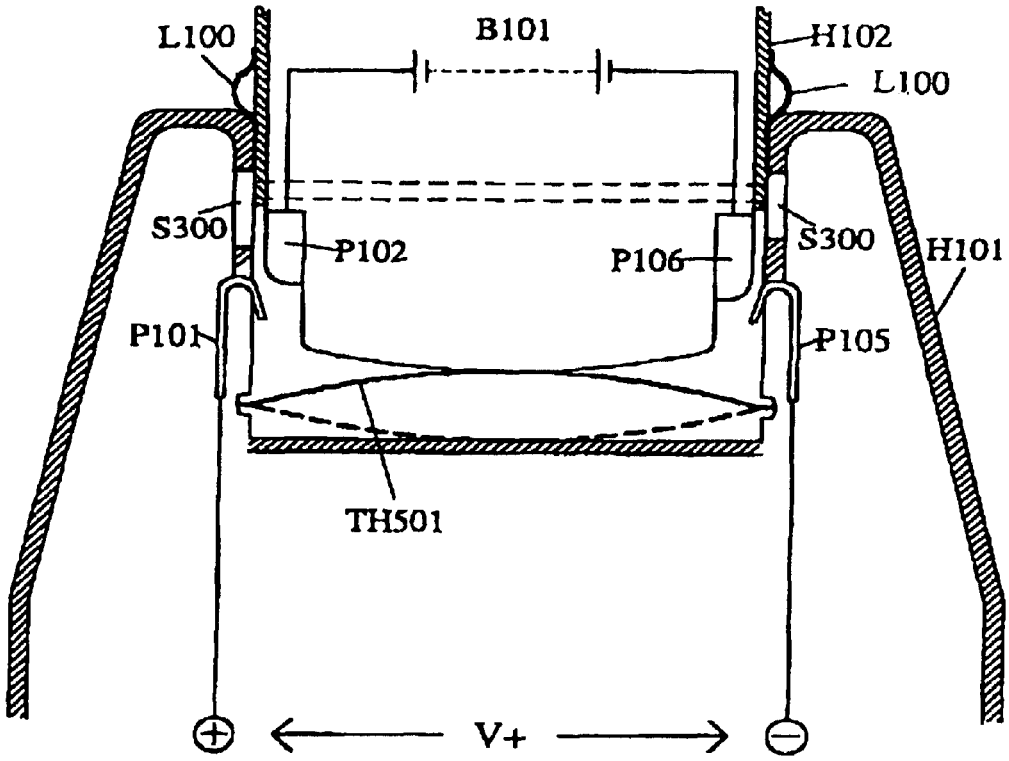
FIG. 9 shows a fifth embodiment of a invention in which the temperature sensor is executed in the form of a memory alloy or alternatively of a thermo-setting binary metal installed between the secondary cell and the charging assembly.

A fifth embodiment of the invention in which the temperature sensor is executed in the form of a memory alloy or binary metal base thermosetting structure interposed between the secondary cell set and the charging assembly, is illustrated in FIG. 9, with the secondary cell set H102 comprising at least one elastic positioning tenon L100 to be matched with counterpart coulisse S300 provided on the charging assembly H101. The tenon L100 and coulisse S300 are have complementary structures so that when the secondary cell H102 is combined with the charging assembly H101, both are coupled in conduction by the engagement realized between the elastic positioning tenon L100 and the coulisse or mortise S300, thereby putting contacts P102, P106 on the secondary cell H102 into conductive coupling with contacts P101, P105 on the charging assembly H101. As a result, charging power from the charging assembly H101 will charge the secondary cell B101 in the secondary cell set H102, and by the force of union, the memory alloy or binary metal base thermosetting structure TH501 will be compressed such that once the secondary cell B101 is charged to saturation, increasing the temperature to a predetermined level, the thermosetting structure TH501 composed of a memory alloy or binary metal lying between the secondary cell H102 and the charging assembly H101 will be deformed, releasing the contact-to-contact coupling between the secondary cell H102 and the charging assembly H101, and further, disengaging the elastic positioning tenon on the secondary cell H102 from the mortise on the charging assembly H101 so that charging current to the secondary cell B101 is cut off forthwith. This embodiment essentially comprises:

Charging assembly H101 in plane or dovetail coupling with the secondary cell set H102, and equipped with D.C. power supply and contacts P101, P105 for coupling with the secondary cell set H102;

A D.C. power supply or source of D.C. power converted through rectification from an A.C. source, and serving to charge the secondary cell by way of a charging circuit;

Secondary cell set H102 enclosed in an insulation casing and equipped with a secondary cell B101 and contacts P102, P106 meant for coupling with the positive/negative terminals of the secondary cell B101, the interface between the secondary cell set H102 and the charging assembly H101 being equipped with a memory alloy or binary metal base thermosetting structure TH501;

At least one elastic positioning tenon L100 equipped on the secondary cell H102, and a corresponding mortise S300 provided on the charging assembly H101, thereby forming a pair which may have complementary structures;

One or more alloy or binary metal base thermosetting structures TH501 between the coupling front of both the charging assembly H101 and the secondary cell H102, so that compression is received when both are combined together, and so that when there is a rise in temperature due to saturation of the secondary cell B101, the memory alloy or binary metal base thermosetting structure (s) TH501 will be affected by the heat produced thereby and expand to cause coupling of the elastic tenon with the mortise, releasing the coupling of the secondary cell H102 with the charging assembly H101, and undoing the contact-to-contact coupling between the secondary cell and the charging assembly, cutting-off charging current to the secondary cell B101. Those skilled in the art will appreciate that the memory alloy or binary metal base thermosetting structure TH501 maybe equipped on the charging assembly H101 or alternatively, where justified, on the secondary cell H102.

Figure 10:
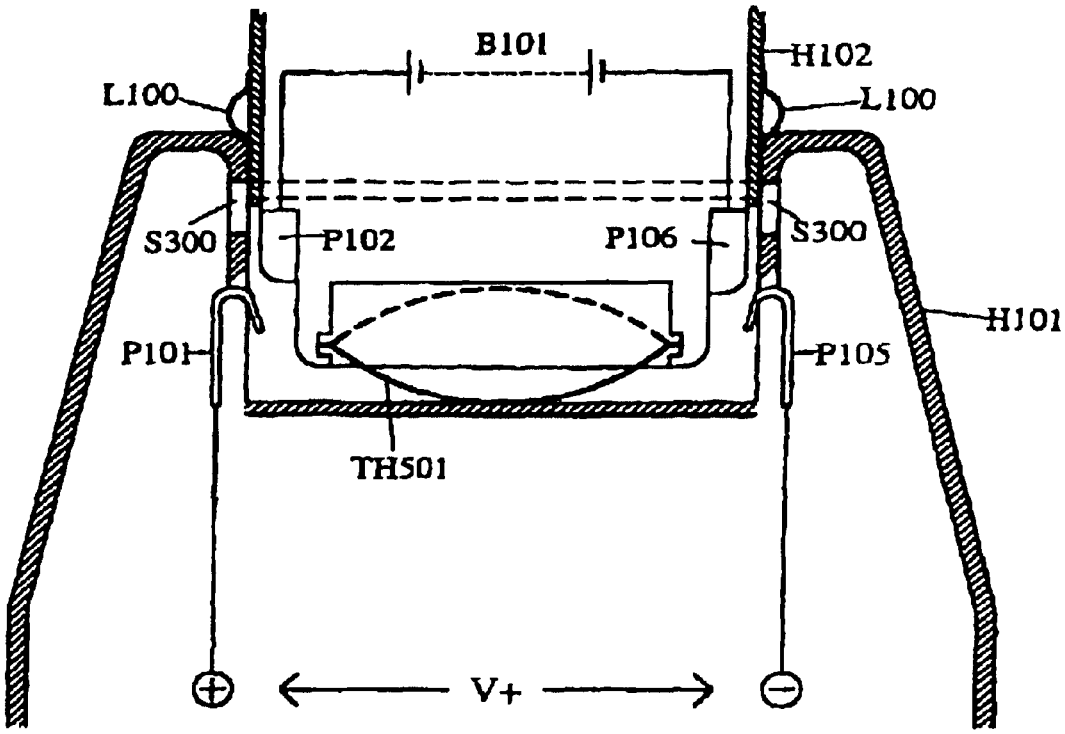
FIG. 10 shows a sixth embodiment of the invention in which the member in the form of a memory alloy or of a thermosetting binary metal, pursuant to the embodiment of FIG. 9, is installed in the secondary cell set instead.

A sixth embodiment of the invention in which the memory alloy or binary metal base thermosetting structure according to the embodiment of FIG. 9 is installed on the secondary cell set illustrated in FIG. 10.

Figure 11:
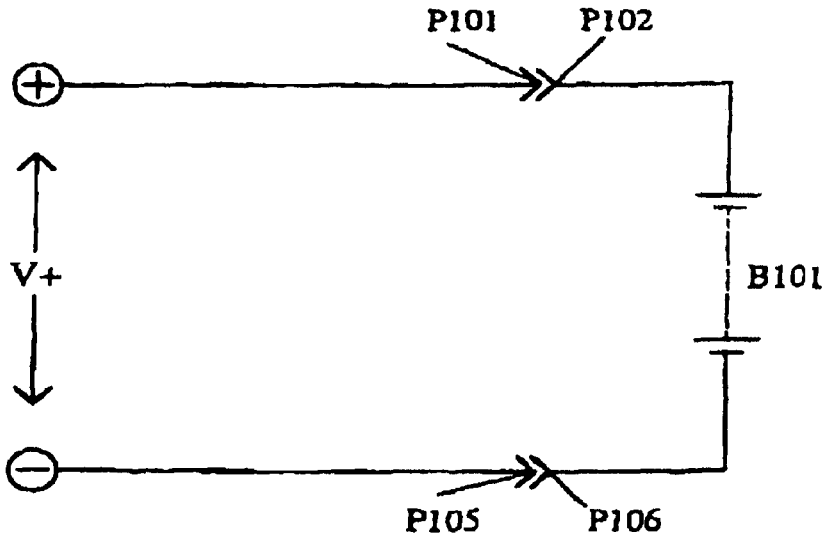
FIG. 11 is a circuit diagram good for the embodiment of either FIG. 9 or FIG. 10.

A circuit diagram illustrative of both examples given in the illustration of FIGS. 9 and 10, is given in FIG. 11.

Figure 12:
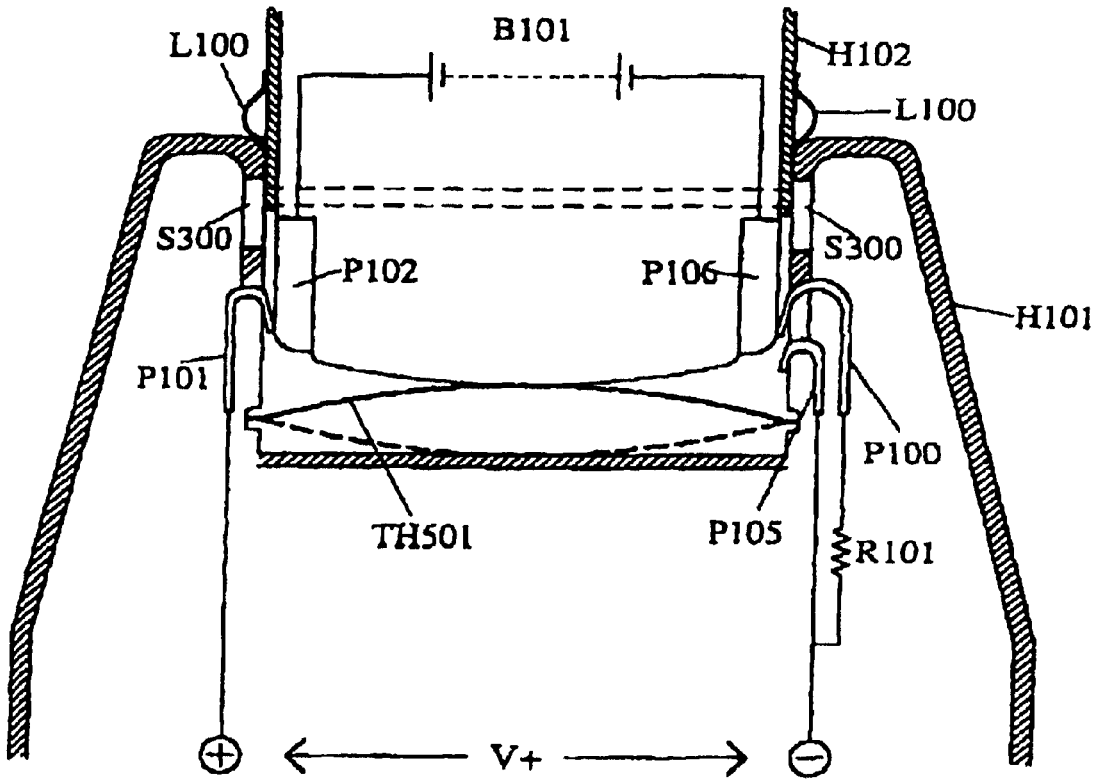
FIG. 12 shows a seventh embodiment of the invention.

A seventh example of the invention is illustrated in FIG. 12, which is in fact a modification of the example shown in FIG. 9 by the addition of an auxiliary conductive contact P100 to the charging assembly H101, so that once a rise in temperature is occasioned by the charging of the secondary cell B101 to saturation, the memory alloy or binary metal base thermosetting structure TH501 resets itself due to the heat produced thereby, releasing the contact-to-contact coupling between the secondary cell and the charging assembly, and cutting-off the charging current to the secondary cell B101, at which time contact P101 on the charging assembly H101 is still is still in electrical contact with contacts P102 on the secondary cell H102. As a result of the provision of an auxiliary contact P100 which is in series with power supply by the intervention of a current limiting resistor R101, conductive contact P106 on the secondary cell H102 is made conductive so that an ongoing small current is maintained from power supply to the secondary cell B101.

Figure 13:
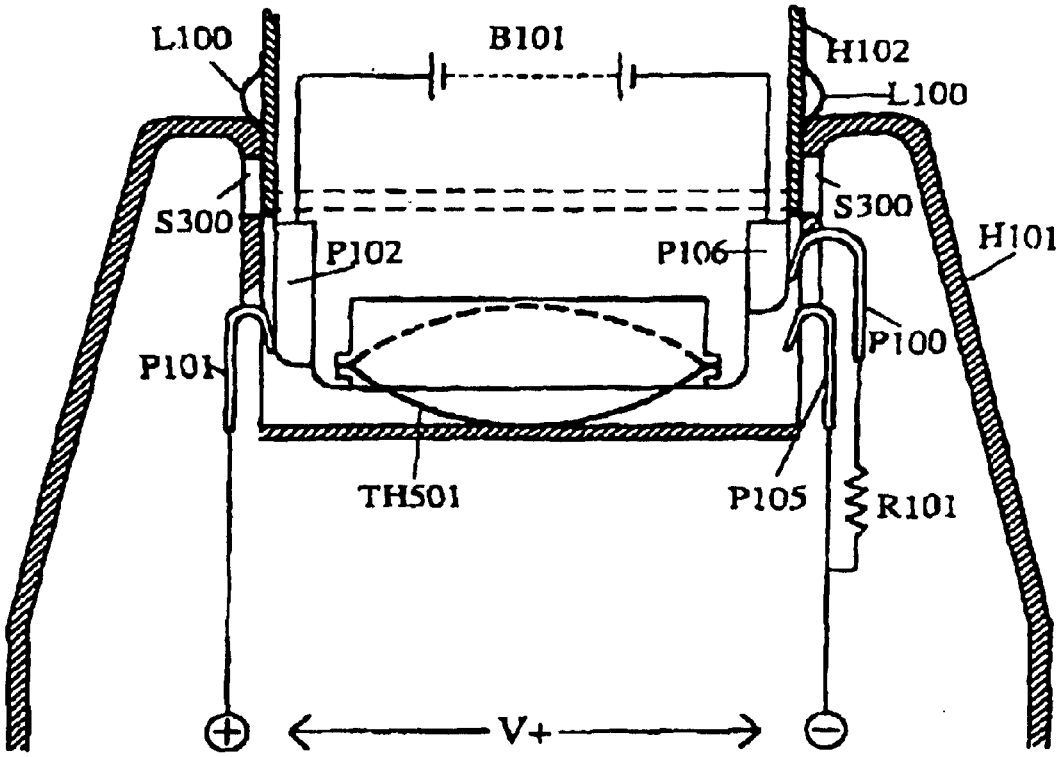
FIG. 13 shows an eighteen embodiment of the invention in which the memory alloy or thermosetting binary metal, pursuant to the embodiment of FIG. 12 is installed in the secondary cell.

An eighth example of the invention is shown in FIG. 13 which is a variant of the example shown in FIG. 12, in which the memory alloy or binary metal base thermosetting structure is installed in the secondary cell set instead.

Figure 14:
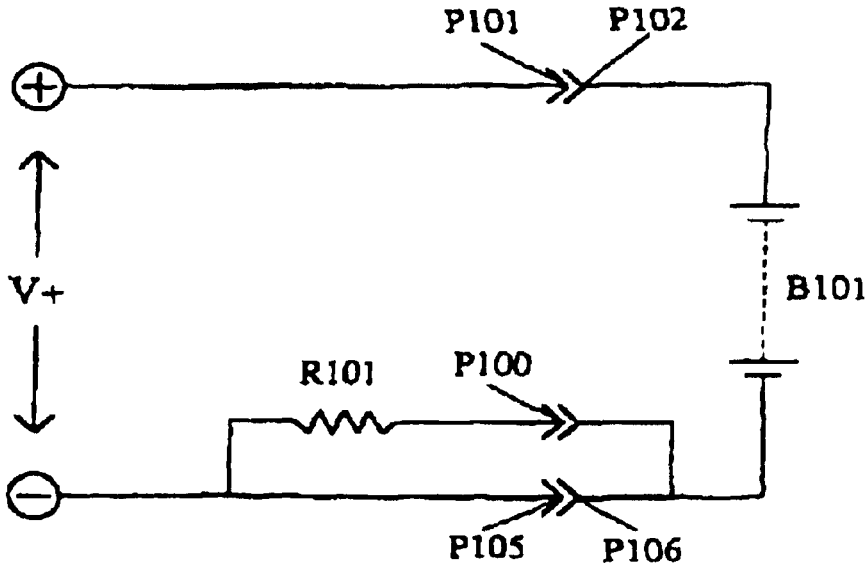
FIG. 14 is a circuit diagram for the embodiments of both FIG. 12 and FIG. 13.

A circuit diagram illustrative of both examples covered in FIG. 12, FIG. 13, is given in FIG. 14.

Figure 15:
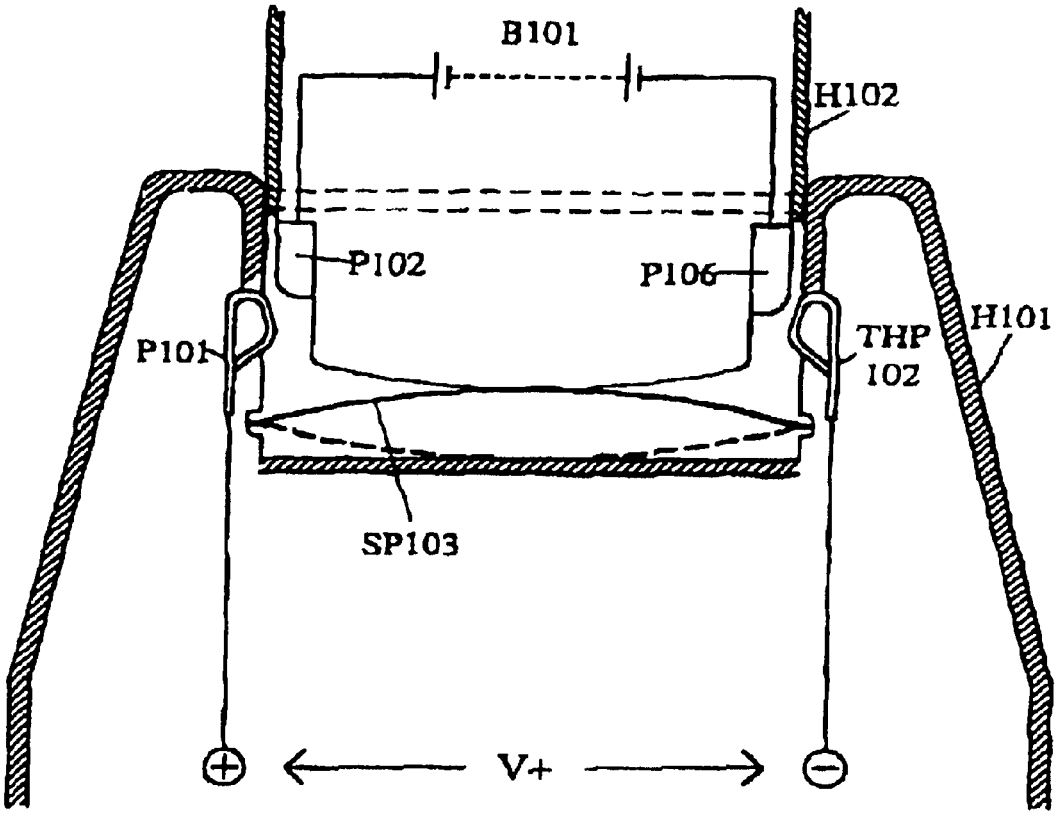
FIG. 15 shows a ninth embodiment of the invention in which the temperature sensor is executed in the form of a compression spring in conjunction with a thermosetting conductive contact made of a memory alloy or of a binary metal, installed between the secondary cell set and the charging assembly.

FIG. 15 illustrates a ninth example of the invention in which a compression spring is interposed between the secondary cell and the charging assembly, and the temperature sensor is executed in the form of a memory alloy or binary metal base thermosetting contact structure, with the provision of conductive contacts P311, P312 having mortise thereon on the secondary cell set H102, on the one hand, and provision of counterpart thermosetting conductive contacts THP101, THP102, made of memory alloy or binary metal, on the charging assembly. On the other hand, both parts may be reciprocally replaceable. When the secondary cell set H102 and the charging assembly H101 are combined together, said pair of conductive contacts will be engaged elastically in conduction. The force of union occasioned thereupon compressing the compressible piece of or annular spring SP103. Once charging in the secondary cell B101 reaches its saturation such that the rise in temperature occasioned thereby comes to a predetermined level, the heat produced in the meantime will deform the memory alloy or binary metal base thermosetting contacts THP101, THP102 located in the charging assembly H101. The structure will then get rid of coupling between corresponding contacts on the secondary cell H102, cutting-off charging current to the secondary cell B101 concurrent with release of the prestress stored in the compression spring SP103 to disengage the contact-to-contact coupling between the secondary cell and the charging assembly. This embodiment comprises essentially:

Charging assembly H101 in plane or dovetail coupling with the secondary cell set H102, and comprising a D.C. power supply and memory alloy or binary metal base thermosetting contacts P101, P105 meant for coupling with counterpart contacts on the secondary cell set H102;

A D.C. power supply for supplying D.C. power and/or for converting, through rectification, power from an A.C. soruce, to charge the secondary cell set by way of a charging circuit;

Secondary cell set H102 enclosed in an insulation casing, and equipped with secondary cell B101 and contacts P312, P311 for coupling with positive/negative terminals of the secondary cell B101, the interface between the secondary cell set H102 and the charging assembly H101 being equipped with a compressible piece or annular spring, contacts P311, P312 including a positioning mortise thereon, and the charging assembly H101 being equipped with a memory alloy or binary metal base thermosetting contacts THP101, THP102 which are reciprocally replaceable, and compressible piece or annular spring SP103 being interposed between the coupling interface of the charging assembly H101 and the secondary cell set H102, such that when both are coupled the compression produced thereby will leave its effect upon spring SP103, and when charging in the secondary cell B101 reaches its saturation to incur a rise in temperature accompanied with heat produced thereby to deform the memory alloy or binary metal base thermosetting contacts THP101, THP102, the contact-to-contact coupling between the secondary cell set H102 and the charging assembly H101 will be broken concurrent with cutoff of charging current to the secondary cell B101, the compression spring SP103 being released at the same time to break the contact-to-contact coupling between the secondary cell set and the charging assembly.

Figure 16:
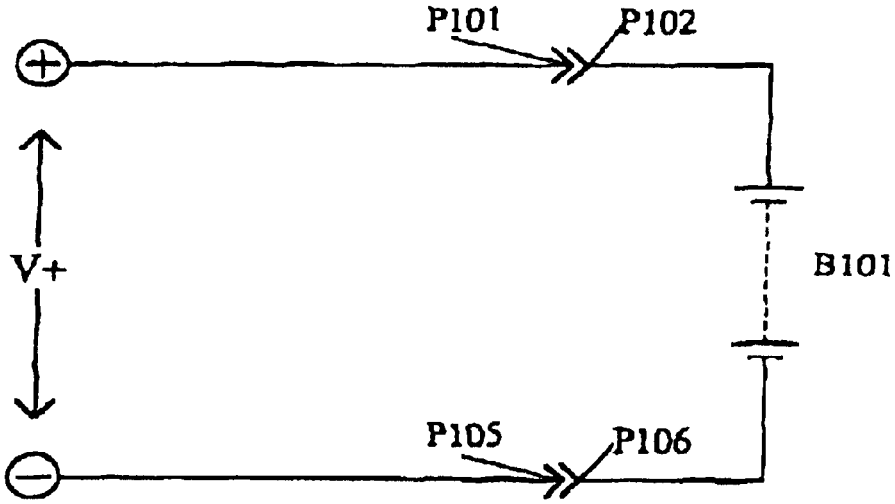
FIG. 16 is a circuit diagram for the embodiment of FIG. 15.

A circuit diagram descriptive of the embodiment of FIG. 15 is given in FIG. 16.

Figure 17:
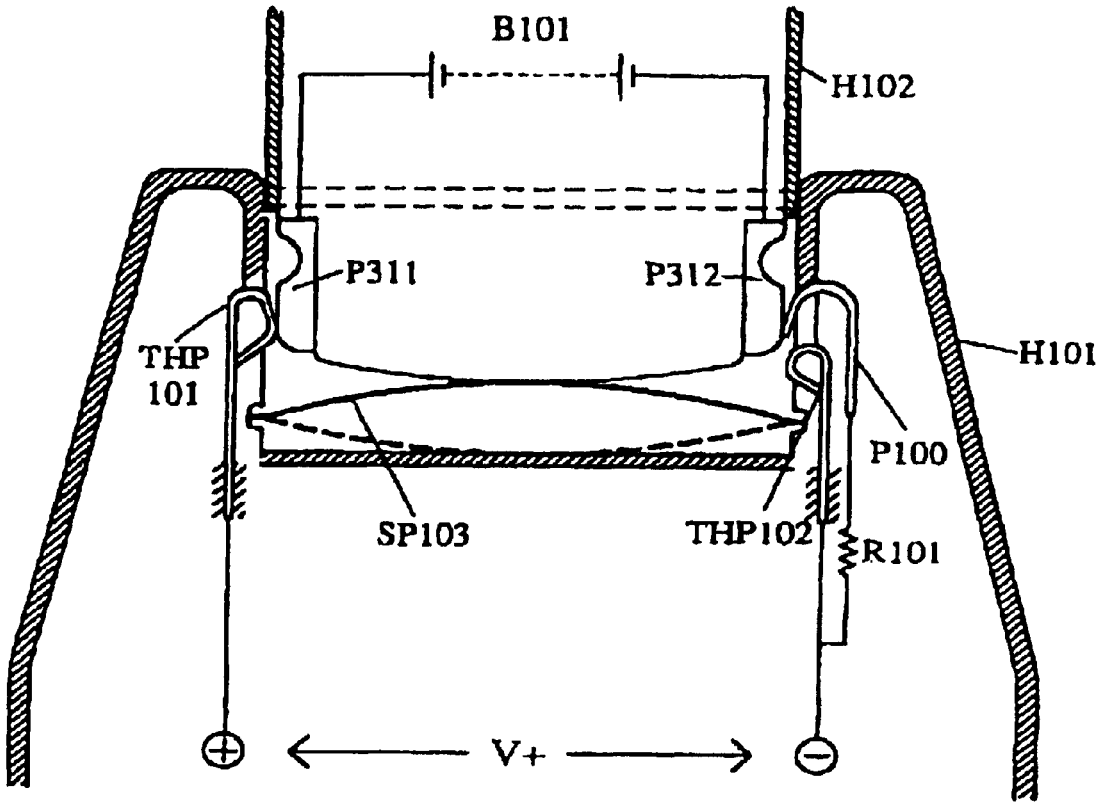
FIG. 17 shows a tenth embodiment of the invention.

A tenth embodiment of the invention is illustrated in FIG. 17, which is in fact a modification of the embodiment shown in FIG. 15 by the addition of an auxiliary conductive contact P100 to the charging assembly H101. Once a rise in temperature is occasioned by the charging of the secondary cell B101 to its saturation, such that the memory alloy or binary metal base thermosetting contacts THP101, THP102 relax themselves due to the heat produced thereby, the contact-to-contact coupling between the secondary cell and the charging assembly will be broken, including (as in the other embodiments of the invention) alternatively disengaging contacts on the secondary cell set only, of contacts on or within the charging assembly only, and the charging current to the secondary cell B101 is cut off forthwith, at which time contact THP101 on the charging assembly H101 is still maintained conductive with contact P311 on the secondary cell set H102, so that by the provision of the auxiliary contact P100 in series with a current limiting resistor R101 in line with power supply, conduction is made with contact P312 on the secondary cell set H102, making possible the maintenance of an ongoing, small current charged by the power supply to the secondary cell B101.

Figure 18:
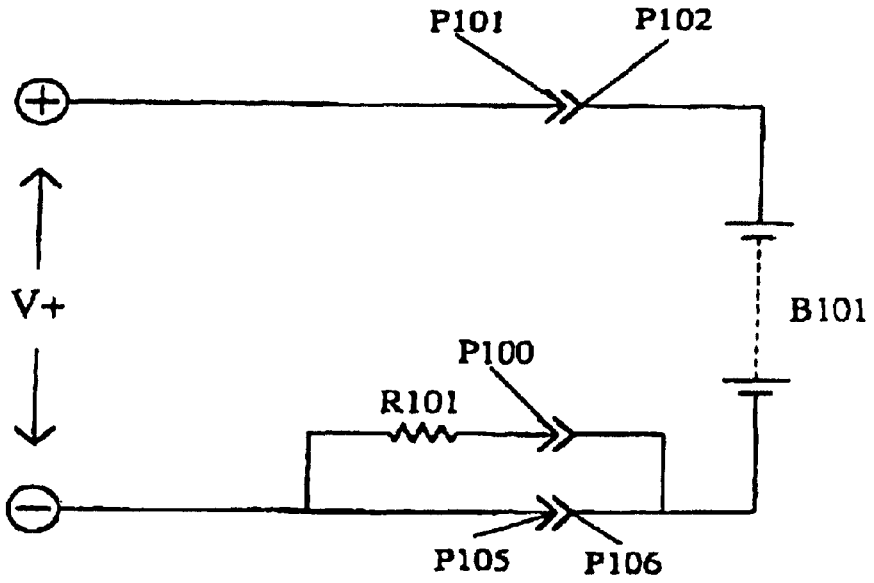
FIG. 18 is a circuit diagram for the embodiment of FIG. 17.

A circuit diagram descriptive of the embodiments of FIG. 17 is given in FIG. 18.

An eleventh example of the invention in which the temperature sensor is executed in the form of a memory alloy or binary metal base thermosetting structure interposed way between the secondary cell and the charging assembly is illustrated in FIG. 19, featuring the provision of a trigger switch LS101 opposite the charging assembly H101, for control of the input side or output side of the power supply. When the secondary cell set H102 and the charging assembly H101 are combined, contacts P102, P106 on the secondary cell set H102 form a conducting pair with contacts P101, P105 on the charging assembly H101. In the meantime, the trigger switch LS101 in control of the power supply for charging purposes is enabled to bring the power supply to the charging assembly H101 for charging of the secondary cell B101 in the secondary cell set H102. Again, the force of union incurred thereupon will compress, in the meantime, the memory alloy or binary metal base thermosetting structure TH501, so that when the secondary cell B101 is charged to saturation, a driving power will be created to drive an auxiliary heater HT101, whereby heat is produced to deform the memory alloy or binary metal base thermosetting structure TH501 interposed between the secondary cell set H102 and the charging assembly H101, with the result that the contact-to-contact coupling between the secondary cell set and the charging assembly is broken, including, as in all of the above-described embodiments, alternatively disengaging contacts on the secondary cell set only, or contacts on or within the charging assembly only, concurrent with switching off of the trigger switch LS101 that controls the power supply and is in charge of the charging operation between the secondary cell set H102 and the charging assembly H101, followed by cutoff of the charging current to the secondary cell B101. This embodiment comprises essentially:

Charging assembly H101 in plane or dovetail coupling with the secondary cell set H102, and furnished with D.C. power supply and contacts P101, P105 for coupling with the secondary cell set H102, as well as trigger switch LS101, which controls the power supply for charging purposes by switching on or off the input or output of the power supply;

A D.C. power supply as described above;

Secondary cell set H102 enclosed in an insulation casing and incorporating a secondary cell B101 and contacts P102, P106 in line with positive/negative terminals of the secondary cell B101; the coupling interface of the secondary cell set H102 and the charging assembly H101 being interposed with a memory alloy or binary metal base thermosetting structure TH501;

A conventional emplacement for charging stability interposed between the secondary cell set H102 and the charging assembly H101;

Memory alloy or binary metal base thermosetting structure TH501 provided singly or plurally and interposed between the interface of the charging assembly H101 and the secondary cell set H102 and compressed tightly when both are combined together to drive, by the heat produced when charging in the secondary cell B101 reaches its saturation, the auxiliary electric heater HT101, which in turn results in an expansion of the memory alloy or binary metal base thermosetting structure TH501 breaking of the contact-to-contact coupling between the secondary cell set and the charging assembly, including alternatively disengaging contacts on the secondary cell set alone or contacts on or within the charging assembly alone, such that the trigger switch LS101 controlling the power supply is driven open, and charging current to the secondary cell B101 is cut off forthwith.

A twelfth embodiment of the invention is illustrated in FIG. 20, which is in fact a modification of the embodiment shown in FIG. 19 by the addition of an auxiliary conductive contact P100 to the charging assembly H101. When charging in the secondary cell B101 reaches its saturation, heat produced thereby is invested in the form of electric power, which in turn drives the auxiliary electric heater HT101 to yield thermal energy sufficient to reset the memory alloy or binary metal base thermosetting structure TH501, breaking the contact-to-contact coupling between the secondary cell set and the charging assembly, the cutting off charging current to the secondary cell B101, at which time charging assembly H101, through its contact P101 and the secondary cell set H102 through its contact P102 are maintained mutually conductive all the same, while the auxiliary contact P100 in series with the power supply by way of a current limiting resistor R101 maintains electrical contact with contact P106 on the secondary cell B101, such that a small but ongoing current is maintained from the power supply to the secondary cell B101 for charging purposes.

In any of the examples numbered 1 through 12 disclosed hereinbefore, coupling of the charging assembly H101 with the secondary cell set H102 may be executed vertically, and breaking of the coupling may be carried out in a downwards direction as opposed to coupling which is done upwardly; or alternatively the coupling may be executed in a downwards direction, and breaking of the coupling may be carried out upwardly; or the coupling may be executed horizontally, and disengagement likewise horizontally; and indeed coupling and disengagement may be designed and executed at other angles, as preferred in any specific application.

Figure 21:
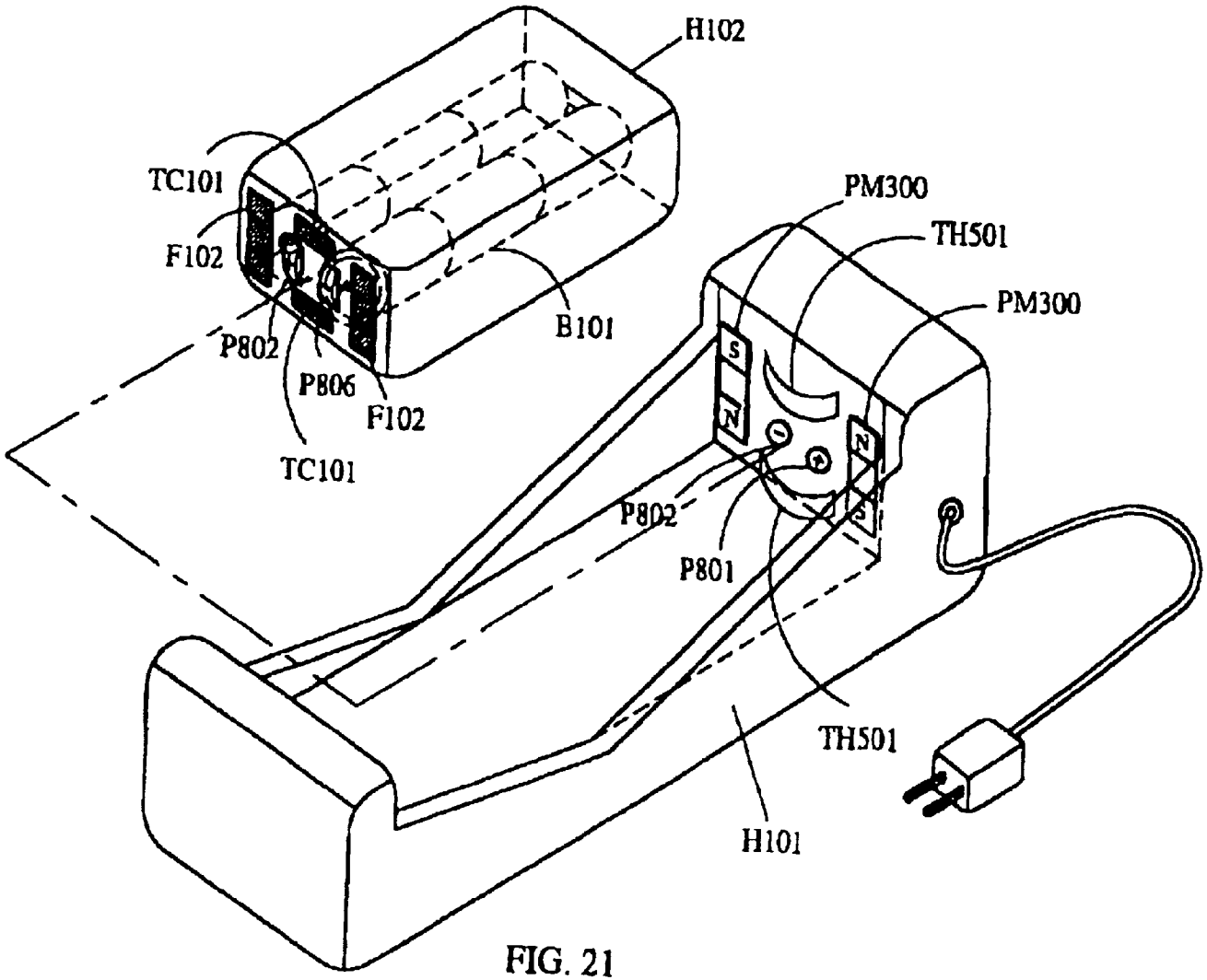
FIG. 21 shows a thirteenth embodiment of the invention that includes a combination of the block of a secondary cell set with a charging circuit featuring an open guided channel.

In FIG. 21 is shown a thirteenth embodiment of the invention, in which the secondary cell set is executed in a block to be coupled with the charging assembly by engaging into a chute channel provided for the purpose. This embodiment comprises:

A charging assembly H101 to be coupled with the secondary cell set vertically upwardly, and disengaged therefrom downwardly; or alternatively to be coupled downwardly and disengaged upwardly; or coupled and disengaged horizontally; or else coupled and disengaged at other chosen angular settings; and on which is provided a chute channel to accommodate the secondary cell set H102; the charging assembly further being furnished with a D.C. power supply and contacts P801, P805 as well as permanent magnet PM300, and memory alloy or binary metal base thermosetting structure TH501 or alternatively a helicoidal spring TH601 of the same base and to the same purpose, and the secondary cell set H102 being equipped with contacts P802, P806 for coupling with the secondary cell B101 and magnet core F102, such that when the charging assembly H101 and the secondary cell set H102 are combined, mutual attraction between the magnet core F102 on the secondary cell set H102 and the permanent magnet PM300 on the charging assembly will compress the memory alloy or binary metal base thermosetting structure TG501, or compress a helicoidal spring TG601 subject to thermally induced deformation, thereby setting contacts P801, P805 on the charging assembly into conduction with contacts P802, P806 on the secondary cell set, followed by charging with respect to the secondary cell B101, whereby since the secondary cell set is equipped with thermotransmission block TC101 which is coupled to the memory alloy or binary metal base thermosetting structure TH501 on the charging assembly, when charging in the secondary cell reaches its saturation concurrent with the release of heat, the memory alloy or binary metal base thermosetting structure TH501 will generate a pushing force in the wake of such heat that is sufficient to disengage both the magnet core F102 and the permanent magnet PM300, coacting contact pairs on both the secondary cell set and on the charging assembly being thereby broken and charging current to the secondary cell B101 cut off forthwith.

This model of charging device features the storage of prestress by maximization of the force of union and the release of the same prestress through thermal actuation to achieve cutting-off of the power supply, and incorporates furthermore a secondary cell charging means of which both positive/negative terminals are meant to be accessed to axial receptacles on specific applications, such that in the wake of a rise in temperature occasioned by charging of the secondary cell to its saturation, the secondary cell set will get rid of the charging electrode, resulting in cutoff of charging current. This embodiment comprises essentially:

A reciprocal, resilient pair of retention couplings formed by contacts P500, P401 on the charging assembly H101 and contacts P500, P501 on the secondary cell set H102, and a memory alloy or binary metal base thermosetting structure TH801 executed as a metal sheet or helicoidal spring positioned under the secondary cell set, which cell set H102 remains steady and stable when loaded with a secondary cell B101 therein, the thermosetting structure TH801 being deformed thermally when the secondary cell set H102 is charged to saturation by an amount sufficient to break the contact-to-contact coupling between the secondary cell set and the charging assembly.

Figure 22:
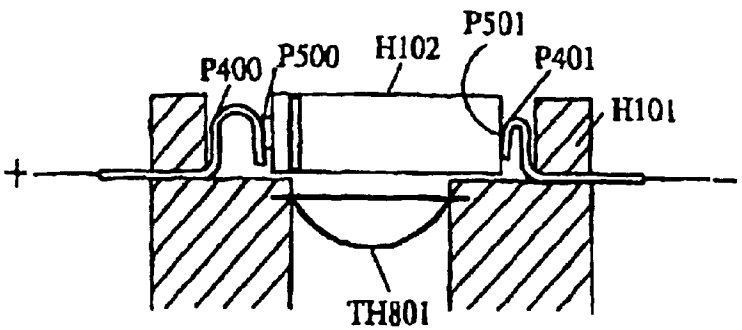
FIG. 22 illustrates the invention in a charging state which accounts for a fourteenth embodiment hereunder.
Figure 23:
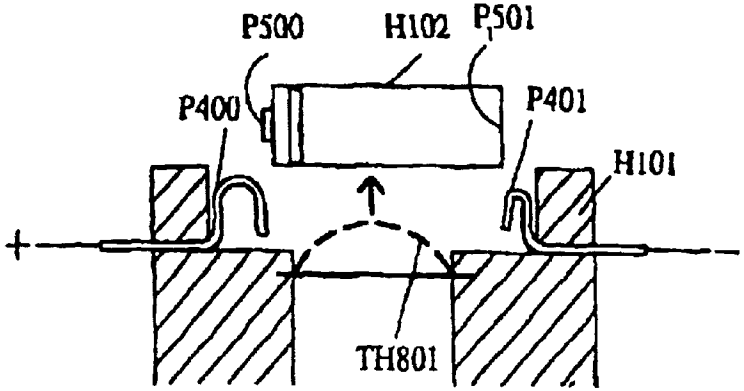
FIG. 23 shows a fourteenth embodiment of the invention in which a power supply is blocked by the disengagement of connection contacts between the secondary cell set and the charging assembly, including alternatively, disengagement of conductive contacts only of the secondary cell set, or of the charging assembly, or of contacts inside the charging assembly, occasioned by a charging saturation.
Figure 24:
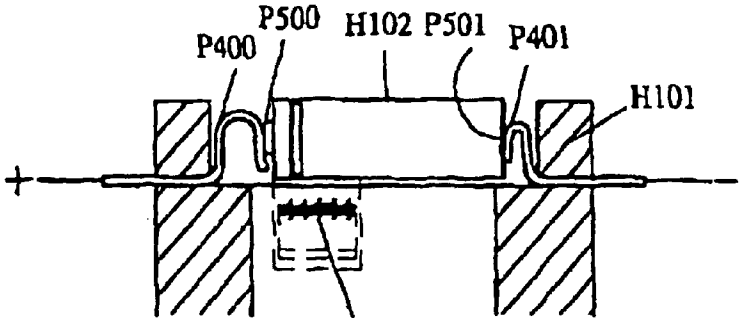
FIG. 24 illustrates a charging state of a fifteenth embodiment of the invention.
Figure 25:
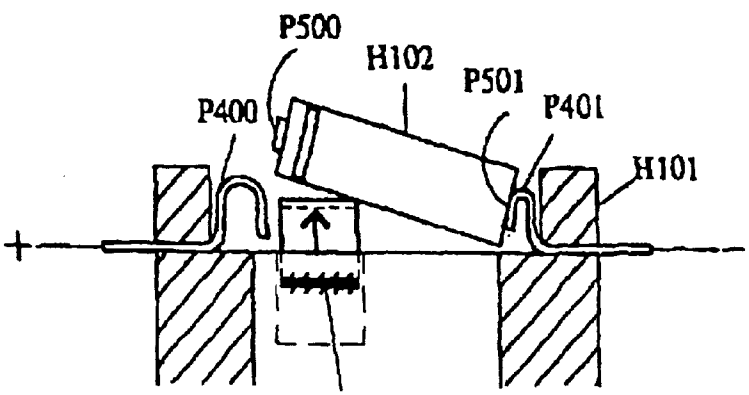
FIG. 25 illustrates the working of the fifteenth embodiment of the invention in which a power supply is blocked by the disengagement of connection contacts between the secondary cell set and the charging assembly, including alternatively, disengagement of conductive contacts only of the secondary cell set, of the charging assembly, or of contacts inside the charging assembly, occasioned by charging saturation.
Figure 26:
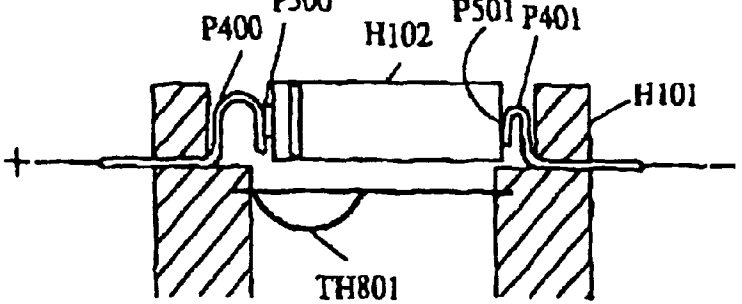
FIG. 26 illustrates a sixteenth embodiment of the invention in a charging state.
Figure 28:
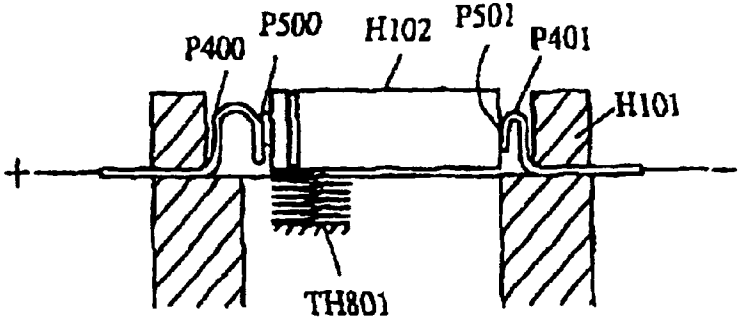
FIG. 28 shows a seventeenth embodiment of the invention seen in a charging state.
Figure 27:
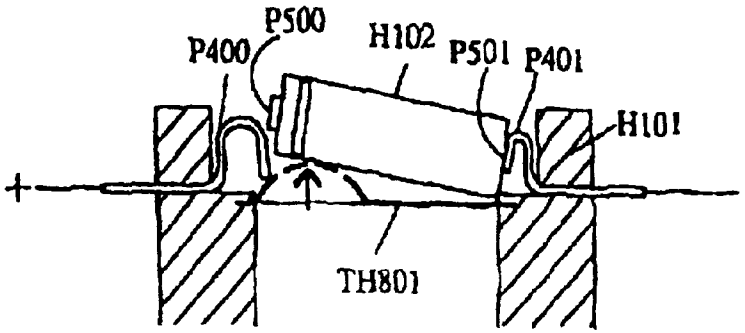
FIG. 27 illustrates the working of the sixteenth embodiment of the invention in which a power supply is blocked by the disengagement of connection contacts between the secondary cell set and the charging assembly, including alternatively, disengagement of conductive contacts only of the secondary cell set, of the charging assembly, or of contacts inside the charging assembly, occasioned by charging saturation.
Figure 29:
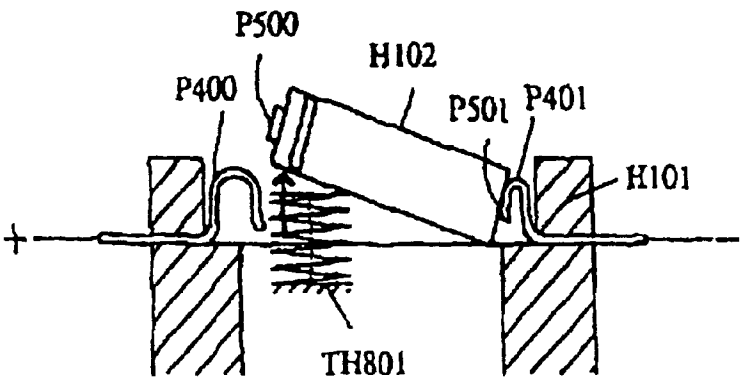
FIG. 29 illustrates the working of the seventeenth embodiment of the invention in which a power supply is blocked by the disengagement of connection contacts between the secondary cell set and the charging assembly, including alternatively, disengagement of conductive contacts only of the secondary cell set, of the charging assembly, or of contacts inside the charging assembly, occasioned by charging saturation.

FIG. 22 is an illustration of the invention in a charging state which accounts for a fourteenth embodiment hereunder;

FIG. 23 is an illustration of a fourteenth embodiment of the invention in which the power supply is blocked by the disengagement of contacts between the secondary cell set and the charging assembly, including alternatively, disengagement of conductive contacts only of the secondary cell set, or only on or within the charging assembly, occasioned by a round of charging saturation;

FIGS. 24 and 25 respectively illustrate a fifteenth embodiment of the invention in which the power supply is first in a charging state then blocked by the disengagement of contacts between the secondary cell set and the charging assembly, including alternatively, disengagement of contacts only of the secondary cell set, or on or within the charging assembly only, occasioned by a charging saturation;

FIG. 26 illustrates a sixteenth embodiment of the invention in a charging state and FIG. 27 illustrates the sixteenth embodiment of the invention in a state in which the power supply is blocked by the disengagement of contacts between the secondary cell set and the charging assembly, including alternatively, disengagement of contacts only of the secondary cell set, or only on or within the charging assembly, occasioned by a charging saturation;

FIG. 28 illustrates a seventeenth embodiment of the invention seen in a charging state and FIG. 29 illustrates the operation of the seventeenth embodiment of the invention, in which the power supply is blocked by the disengagement of contacts between the secondary cell set and the charging assembly, including alternatively, disengagement of contacts only of the secondary cell set, or only on or within the charging assembly, occasioned by charging saturation.

Figure 30:
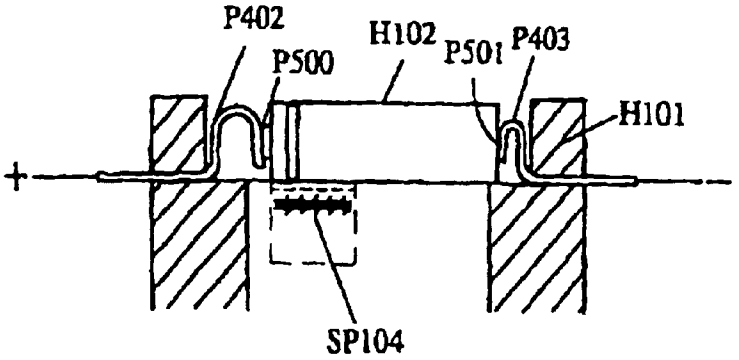
FIG. 30 illustrates the charging state of an eighteenth embodiment of the invention.
Figure 31:
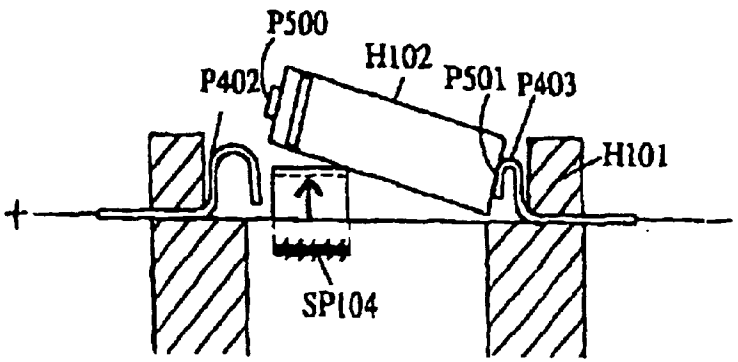
FIG. 31 illustrates the working of the eighteenth embodiment of the invention in which a power supply is blocked by the disengagement of connection contacts between the secondary cell set and the charging assembly, including alternatively, disengagement of conductive contacts only of the secondary cell set, of the charging assembly, or of contacts inside the charging assembly, occasioned by charging saturation.
Figure 32:
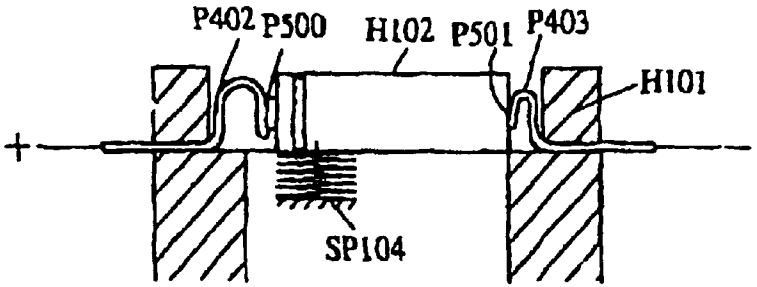
FIG. 32 illustrates a charging state of a nineteenth embodiment of the invention.
Figure 33:
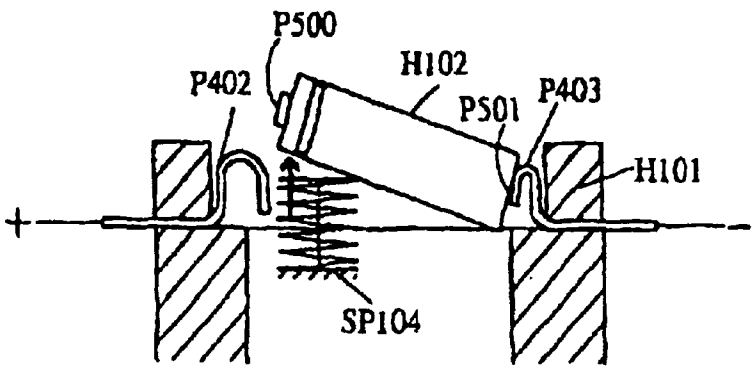
FIG. 33 illustrates the operation of the nineteenth embodiment of the invention in which a power supply is blocked by the disengagement of connection contacts between the secondary cell set and the charging assembly, including alternatively, disengagement of conductive contacts only of the secondary cell set, of the charging assembly, or of contacts inside the charging assembly, occasioned by charging saturation.
Figure 34:
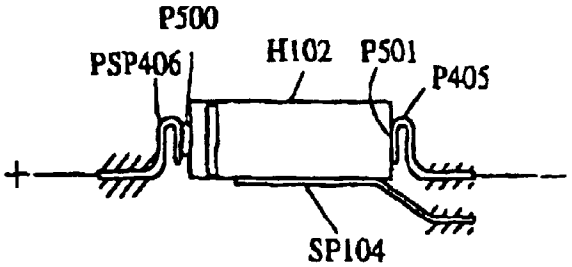
FIG. 34 illustrates a charging state of a twentieth embodiment of the invention.
Figure 35:
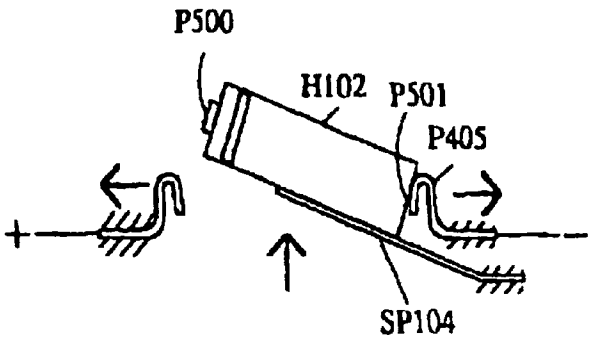
FIG. 35 illustrates the operation of the twentieth embodiment of the invention in which a power supply is blocked by the disengagement of connection contacts between the secondary cell set and the charging assembly, including alternatively, disengagement of conductive contacts only of the secondary cell set, of the charging assembly, or of contacts inside the charging assembly, occasioned by charging saturation.
Figure 36:
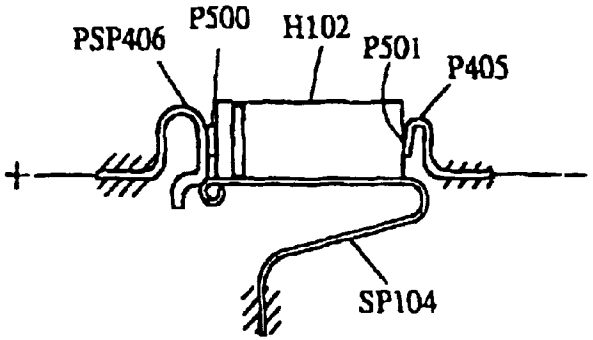
FIG. 36 illustrates a charging state of a twenty first embodiment of the invention.
Figure 37:
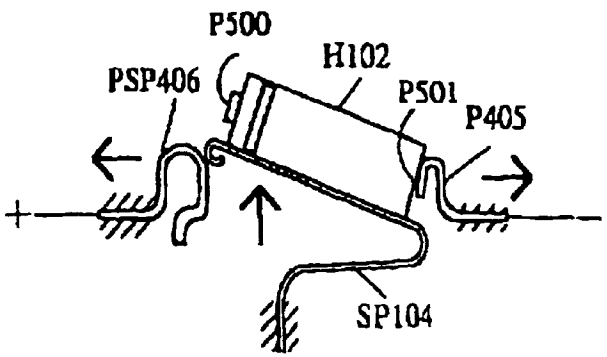
FIG. 37 illustrates the twenty first embodiment of the invention in which power supply is blocked by the disengagement of connection contacts between the secondary cell set and the charging assembly, including alternatively, disengagement of conductive contacts only of the secondary cell set, or of the charging assembly, or of contacts inside the charging assembly, occasioned by a charging saturation.

In the embodiments illustrated in FIGS. 30–33, contacts P402, P403 serve as conduction points for the memory alloy or binary metal base thermosetting structure, upon coupling with counterpart contacts P500, P501 on the secondary cell set H102, and also to store and exhibit resilient retention for holding the secondary cell set H102. When compressible spring SP104, executed as a plate of helical spring integral with the secondary cell B101, is loaded into the secondary cell set H102, thereby providing a compression means, the contacts P402, P403, will become deformed by the heat released once charging in the secondary cell reaches its saturation, at which time the secondary cell set H102 is released, and the compression spring SP104 will break the contact-to-contact coupling between the secondary cell and the charging assembly, including alternatively disengaging contacts only of the secondary cell set, or on or within the charging assembly, so that charging is terminated forthwith, as explained below:

FIG. 30 illustrates an eighteenth embodiment of the invention; and FIG. 31 illustrates the working of the eighteenth embodiment of the invention, in which the power supply is blocked by the disengagement of contacts between the secondary cell set and the charging assembly, including alternatively, disengagement of contacts only of the secondary cell set, or only of or within the charging assembly, occasioned by charging saturation;

FIG. 32 illustrates a charging state of a nineteenth embodiment of the invention; and FIG. 33 illustrates the working of a nineteenth embodiment of the invention, in which the power supply is blocked by the disengagement of contacts between the secondary cell set and the charging assembly, including alternatively, disengagement of contacts only of the secondary cell set, or of or within the charging assembly only, occasioned by charging saturation;

FIG. 34 illustrates a charging state of a twentieth embodiment of the invention; and FIG. 35 illustrates the working of the twentieth embodiment of the invention, in which the power supply is blocked by disengagement of contacts between the secondary cell set and the charging assembly, including alternatively, disengagement of contacts only of the secondary cell set, or of or within the charging assembly, occasioned by a charging saturation;

FIG. 36 illustrates a charging state of a twenty first embodiment of the invention; and FIG. 37 illustrates a twenty first embodiment of the invention, in which power supply is blocked by the disengagement of contacts between the secondary cell set and the charging assembly, including alternatively, disengagement of contacts only of the secondary cell set, or of or within the charging assembly only, occasioned by charging saturation.

Figure 40:
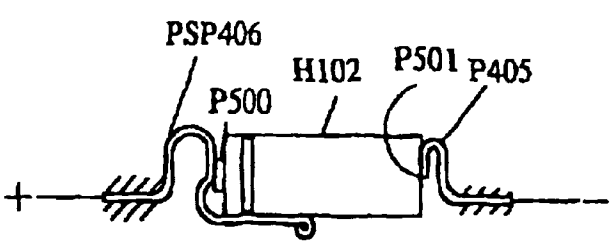
FIG. 40 illustrates a charging state of a twenty third embodiment of the invention.
Figure 38:
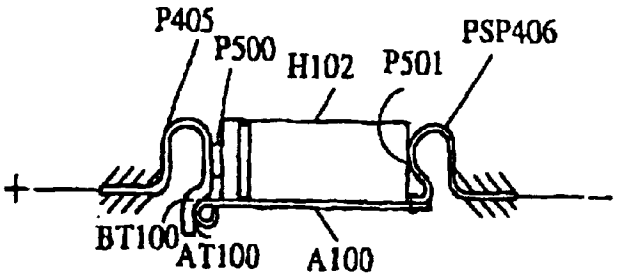
FIG. 38 illustrates a charging state of a twenty second embodiment of the invention.
Figure 41:
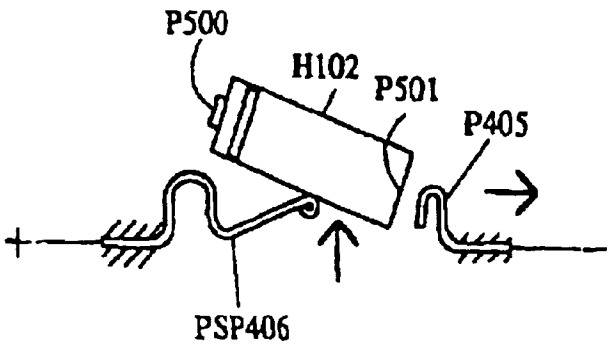
FIG. 41 illustrates a twenty third embodiment of the invention in which power supply is blocked by the disengagement of connection contacts between the secondary cell set and the charging assembly, including alternatively, disengagement of conductive contacts only of the secondary cell set, of the charging assembly, or of contacts inside the charging assembly, occasioned by charging saturation.
Figure 39:
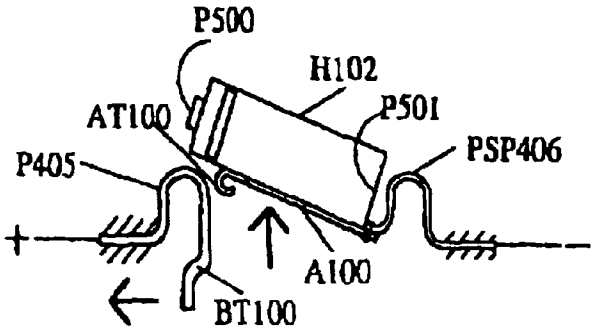
FIG. 39 illustrates the twenty second embodiment of the invention in which power supply is blocked by the disengagement of connection contacts between the secondary cell set and the charging assembly, including alternatively, disengagement of conductive contacts only of the secondary cell set, of the charging assembly, or of contacts inside the charging assembly, occasioned by charging saturation.

As a result of the contacts P405 being furnished on the memory alloy or binary metal base thermosetting charging assembly H101, and another set of contacts PSP406 featuring a prestressed spring function, extended with an insulated stretch arm A100, when a secondary cell set is loaded, coupling will be made with respect to contacts P500, P501 on the secondary cell set H102, which, together with the secondary cell set H102 being clamped in the meantime, will start charging with respect to the secondary cell set, whereupon the engaging head AT100 on the tail end of the insulated stretch arm A100 is matched with counterpart engaging receptacle BT100 on the tail end of the memory alloy base in a prestressed engagement. When charging in the secondary cell set H102 reaches saturation to release heat, contact P405 on the charging assembly H101, on receiving said heat, will be deformed, resulting in dissociation of the insulated stretch arm A100 on the contact PSP406 that is retained by prestress, apart from the engaging receptacle BT100, such that the secondary cell set H102 is released, after which the prestress stored in the insulated stretch arm A100 on the contact PSP406 enabled by said prestress will break the contact-to-contact coupling thus far established between the secondary cell set and the charging assembly, alternatively through disengagement of contacts on the secondary cell set only, contacts on or within the charging assembly only, or both, and power supply for charging purposes cut off forthwith. As an alternative structure the two sets of contacts on the charging assembly H101 may comprise entirely prestressed thermosetting, spring-functioning contacts with extension of an insulated stretch arm, in respect of which several embodiments include those given in:

FIG. 38, which illustrates a charging state of a twenty second embodiment of the invention; and FIG. 39, which illustrates the twenty second embodiment of the invention, in which the power supply is blocked by the disengagement of contacts between the secondary cell set and the charging assembly, including alternatively, disengagement of contacts only of the secondary cell set, or of or within the charging assembly only, occasioned by charging saturation;

FIG. 40, which illustrates a charging state of a twenty third embodiment of the invention; and FIG. 41, which illustrates the twenty third embodiment of the invention, in which the power supply is blocked by the disengagement of contacts between the secondary cell set and the charging assembly, including alternatively, disengagement of contacts only of the secondary cell set, or of or within the charging assembly only, occasioned by charging saturation.

Figure 42:
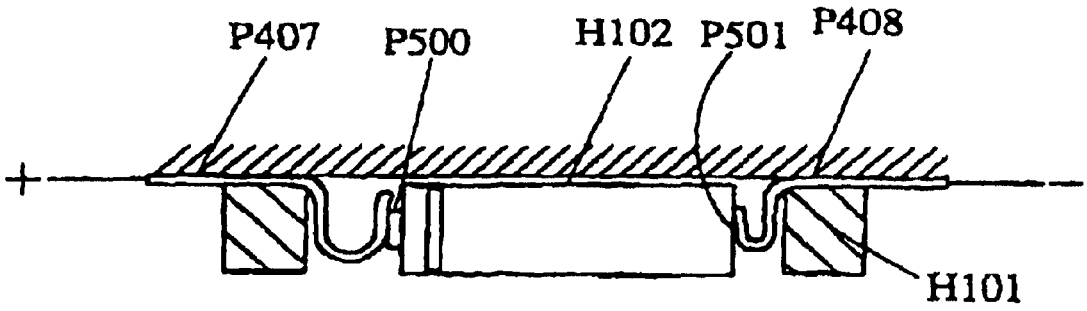
FIG. 42 illustrates a charging state of a twenty fourth embodiment of the invention; and, FIG. 43 illustrates a twenty fourth embodiment of the invention in which a power supply is blocked by the disengagement of connection contacts between the secondary cell set and the charging assembly, including alternatively, disengagement of conductive contacts only of the secondary cell set, of the charging assembly, or of contacts inside the charging assembly, occasioned by charging saturation.
Figure 43:
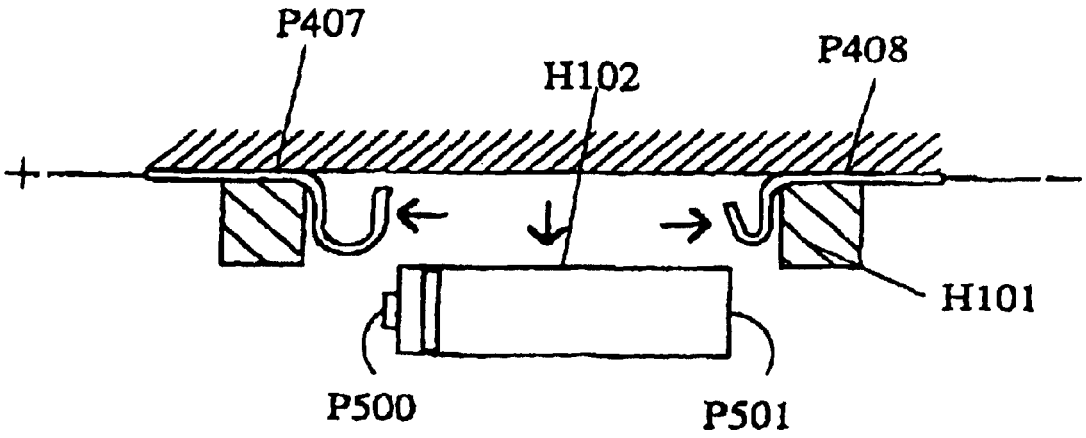

Contacts P407, P408 on the memory alloy or binary metal base thermosetting charging assembly H101, serve not only to be coupled to contacts P500, P501 on the secondary cell set H102, but also to hold the secondary cell set H102 in place as well. When the secondary cell set H102 is charged to saturation followed by release of heat, contacts P407, P408 on the charging assembly H101, receiving the heat, will release hold of the secondary cell set H102, so that the secondary cell set H102 will drop forthright clear of contacts P407, P408, and the charging capability is blocked forthwith, as follows:

FIG. 42 illustrates a charging state of a twenty fourth embodiment of the invention; and FIG. 43 illustrates the twenty fourth embodiment of the invention, in which the power supply is blocked by the disengagement of contacts between the secondary cell set and the charging assembly, including alternatively disengagement of contacts only of the secondary cell set, or only of or within the charging assembly, occasioned by charging saturation.

Since in applications a variety of structures for the execution of thermosetting temperature sensor for the determination of charging saturation occurring with a secondary cell are available, with a view to promote safety in operation, a specific execution may be chosen for the making of a charging assembly featuring reservation of prestress which is to be released to cut off power supply in the wake of heat discharged when charging reaches its saturation, or preferably two or multiple thermosetting temperature sensors may be installed to further enhance the safety feature. In fact, the conventional type of automatic power cutoff models may be combined for use in preferred applications which include but are not limited to those cited below:

1. Those provided with an auxiliary heater which will produce heat when receiving electric power incurred by saturation of charging in the secondary cell set, the auxiliary heater being of a flip-flop binary metal prestressed design or of a thermosetting binary metal design, heat thus produced breaking the contact-to-contact coupling between the secondary cell set and the charging assembly, including alternatively disengaging contacts on the secondary cell set only or of or within the charging assembly only, so that power supply is cut off forthwith; or
2. Those provided with a bistable metal prestressed spring or memory alloy or binary metal base thermosetting structures which, when receiving heat that is produced as charging in the secondary cell reaches saturation, will break the contact-to-contact coupling between the secondary cell set and the charging assembly, including alternatively, disengaging contacts on the secondary cell only, or disengaging contacts on or within the charging assembly, such that power supply is cut off forthwith; or
3. Those provided with a resilient positioning means comprising a memory alloy or binary metal base thermosetting structure which, together with a compression spring seated between the charging assembly and the secondary cell set, will, by releasing the spring due to triggering effect when the thermosetting resets itself in the wake of effectual heat, break the connection to the secondary cell and cut off the power supply forthwith; or
4. Those provided with a resilient positioning means which is bound by conductive contacts and made from a memory alloy or binary metal base thermosetting structure which, when receiving an effectual heat, will trigger a prestressed spring that is seated way between the charging assembly and the secondary cell set, so that the secondary charging cell is disengaged and the charging power supply is cut off forthwith; or
5. Those on which the memory alloy or binary metal base thermosetting structure is executed to be a charging assembly with conductive contacts thereon furnished to accommodate coupling with counterpart contacts on the secondary cell set, and in the mean time to hold the same secondary cell set in place, such that the contacts on the charging assembly, when affected by the heat released from the secondary cell as it is charged to saturation, will get deformed, thereby releasing the secondary cell set which will then drop off the contacts, causing charging to be cut off forthwith;
6. Those structured such that, due to contacts furnished on the memory alloy or binary metal base thermosetting charging assembly, as well as another set of contacts featuring a prestressed spring function, extended with an insulted stretch arm, will establish a coupling and start charging when a secondary cell set is loaded, whereupon the engaging head on the tail end of the insulated stretch arm is matched with counterpart engaging receptacle on the tail end of the memory alloy base. When charging in the secondary cell set reaches its saturation to release heat, contacts on the charging assembly, on receiving said heat, will get deformed, resulting in dissociation of the insulated stretch arm on the contact that is retained by prestress, apart from the engaging receptacle, such that the secondary cell set is released, after which the prestress stored in the insulated stretch arm on the contact enabled by said prestress will break contact-to-contact coupling thus far established between the secondary cell set and the charging assembly, including alternatively disengagement of contacts on the secondary cell set only or contacts on or within the charging assembly only, and cut off the power supply forthwith. As an alternative structure, the two sets of contacts on the charging assembly may comprise entirely prestressed thermosetting of spring-functioning contacts with extension of an insulated stretch arm;
7. Those employing altogether two or more of any of the testing devices specified in item 1 through item 6 disclosed hereinbefore;
8. Those in which the structure of the charging assembly H101 or of the secondary cell set H102 is such that:
   (1) The secondary cell set is executed in a bar for coupling with the charging-assembly that is configured like a bee-hive; or
   (2) The secondary cell set is executed in a block for coupling with the charging assembly which is also executed in a block; or
   (3) The secondary cell set is executed in a block for coupling with the charging assembly which is fitted with an open chute channel to accommodate the coupling purpose; or
   (4) The charging assembly and the secondary cell set are executed for coupling in a vertically upward orientation, but uncoupling in a downward orientation; coupling and uncoupling in the horizontal direction; or for coupling and uncoupling in another angular setting appropriate to specific applications;

9. Those in which the thermosetting structure derives its displacement due to deformation of its casing shell which is to be filled with liquid, fluid or gas, and which follows the law of expansion under heat but shrinkage when cooled, as a function of ambient temperature; or 10. Those in which said secondary cell set is composed entirely and solely of one single cell or battery, or alternatively composed of two or more cells or batteries connected in series or parallel.

In summation, the present invention is a charging device with stress stored by an externally applied force, the stored stress being eventually released by heat due to charging saturation, and therefore is simply structure, functionally justified, highly useful and of novel design.

What is claimed is:

1. A charging device, comprising:

a charging assembly including at least two charging assembly contacts;

a secondary battery set including at least two battery set contacts; and a thermo-resetting bistable spring member, wherein said at least two charging assembly contacts are arranged to engage said at least two battery set contacts, wherein when said at least two charging assembly contacts and said two battery set contacts are pushed together by an external force, said thermo-resetting bistable spring member is pushed from a first position to a second position, said charging assembly and secondary battery set are electrically connected, and charging current is supplied from said charging assembly to said battery set, wherein at least one battery in said battery set generates heat when charged to saturation, wherein said thermo-resetting member is arranged to reset from said second position to said first position and break said electrical connection in response to heat generated by said battery, thereby cutting-off supply of charging current to said battery set; and wherein said thermo-resetting member pushes said secondary battery set at least part way out of said charging assembly when the thermo-resetting member is reset in response to generation of heat upon saturation of said at least one battery in said secondary battery set.

2. A charging device as claimed in claim 1, wherein said thermo-resetting member is a bistable spring.

3. A charging device as claimed in claim 1, wherein said thermo-resetting member is mounted in said charging assembly at an interface between said charging assembly and said secondary battery set.

4. A charging device as claimed in claim 1, wherein said thermo-resetting member is mounted in said secondary battery set at an interface between said secondary battery set and said charging assembly.

5. A charging device as claimed in claims 1, further comprising an auxiliary contact and a resistor connected in series between said auxiliary contact and said power supply, wherein said auxiliary contact arranged to be electrically connected with one of the battery set contacts upon pushing of said secondary battery set at least part way out of said charging assembly and disengagement of said one of the battery set contacts from one of said charging assembly contacts, thereby supplying a reduced, charge-maintaining current to said battery set.

6. A charging device as claimed in claims 1, further comprising an elastic positioning tenon and complementary mortise for retaining said secondary battery set in said charging assembly until heat generated by charge saturation causes said secondary set to be pushed at least part way out of said charging assembly.

7. A charging device as claimed in claim 1, further comprising a trigger switch arranged to turn on said power supply when said secondary battery set is pushed into said charging assembly.

8. A charging device as claimed in claim 1, wherein said thermo-resetting member is a helical spring.

9. A charging device as claimed in claim 1, wherein said thermo-resetting member is a plate spring.

10. A charging device, comprising:

a charging assembly including at least two charging assembly contacts;

a secondary battery set including at least two battery set contacts; and a thermo-resetting bistable spring member, wherein said at least two charging assembly contacts are arranged to engage said at least two battery set contacts, wherein when said at least two charging assembly contacts and said two battery set contacts are pushed together by an external force, said thermo-resetting bistable spring member is pushed from a first position to a second position, said charging assembly and secondary battery set are electrically connected, and charging current is supplied from said charging assembly to said battery set, wherein at least one battery in said battery set generates heat when charged to saturation, wherein said thermo-resetting member is arranged to reset from said second position to said first position and break said electrical connection in response to heat generated by said battery, thereby cutting-off supply of charging current to said battery set, and further comprising at least one permanent magnet arranged to retain said secondary battery set in said charging assembly until said thermo-setting member is reset upon charge saturation.

11. A charging device, comprising:

a charging assembly including at least two charging assembly contacts;

a secondary battery set including at least two battery set contacts; and a thermo-resetting bistable spring member, wherein said at least two charging assembly contacts are arranged to enrage said at least two battery set contacts, wherein when said at least two charging assembly contacts and said two battery set contacts are pushed together by an external force, said thermo-resetting bistable spring member is pushed from a first position to a second position, said charging assembly and secondary battery set are electrically connected, and charging current is supplied from said charging assembly to said battery set, wherein at least one battery in said battery set generates heat when charged to saturation, wherein said thermo-resetting member is arranged to reset from said second position to said first position and break said electrical connection in response to heat generated by said battery, thereby cutting-off supply of charging current to said battery set, and wherein said electrical connection is broken by disengaging one of said charging assembly contacts from one of said battery set contacts on one side of the charging assembly.

12. A charging device, comprising:

a charging assembly including at least two charging assembly contacts;

a secondary battery set including at least two battery set contacts; and a thermo-resetting bistable spring member, wherein said at least two charring assembly contacts are arranged to engage said at least two battery set contacts, wherein when said at least two charging assembly contacts and said two battery set contacts are pushed together by an external force, said thermo-resetting bistable spring member is pushed from a first position to a second position, said charging assembly and secondary battery set are electrically connected, and charging current is supplied from said charging assembly to said battery set, wherein at least one battery in said battery set generates heat when charged to saturation, wherein said thermo-resetting member is arranged to reset from said second position to said first position and break said electrical connection in response to heat generated by said battery, thereby cutting-off supply of charring current to said battery set, and wherein said electrical connection is broken by disengaging both of said charging assembly contacts from both of said battery set contacts.

13. A charging device, comprising:

a charging assembly including at least two charging assembly contacts; and a secondary battery set including at least two battery set contacts;

wherein said at least two charging assembly contacts are arranged to engage said at least two battery set contacts, wherein at least one of said charging assembly contacts or battery set contacts is a thermo-resetting member, wherein when said secondary battery set is pushed into said recharging assembly are pushed together by an external force, said thermo-resetting member is pushed from a first position to a second position, said charging assembly and secondary battery set are electrically connected, and charging current is supplied from said charging assembly to said battery set, wherein at least one battery in said battery set generates heat when charged to saturation, wherein said thermo-resetting member is arranged to reset from said second position to said first position break said electrical connection in response to heat generated by said battery, thereby cutting-off supply of charging current to said battery set, and further comprising a spring member positioned at an interface between said secondary battery set and said charging assembly and arranged to be stressed when said secondary battery set is pushed into said charging assembly and wherein one of said contacts serves as a mortise and said thermo-resetting member serves as a tenon to retain said secondary battery set in said charging assembly, said thermo-resetting member releasing said secondary battery set by disengaging said mortise in response to heat generated by said at least one battery, thereby causing said spring to push said secondary battery set at least part way out of said charging assembly.

14. A charging device as claimed in claims 13, further comprising an auxiliary contact and a resistor connected in series between said auxiliary contact and said power supply, wherein said auxiliary contact arranged to be electrically connected with one of the battery set contacts upon pushing of said secondary battery set at least part way out of said charging assembly and disengagement of said one of the battery set contacts from one of said charging assembly contacts, thereby supplying a reduced, charge-maintaining current to said battery set.

15. A charging device as claimed in claim 13, further comprising an elastic positioning tenon and complementary mortise for retaining said secondary battery set in said charging assembly until heat generated by charge saturation causes said secondary set to be pushed at least part way out of said charging assembly.

16. A charging device, comprising:

a charging assembly including at least two charging assembly contacts; and a secondary battery set including at least two battery set contacts;

wherein said at least two charging assembly contacts are arranged to engage said at least two battery set contacts, wherein at least one of said charging assembly contact or battery set contacts is a thermo-resetting member, wherein when said secondary battery set is pushed into said recharging assembly are pushed together by an external force, said thermo-resetting member is pushed from a first position to a second position, said charging assembly and secondary battery set are electrically connected, and charging current is supplied from said charring assembly to said battery set, wherein at least one battery in said battery set generates heat when charged to saturation, wherein said thermo-resetting member is arranged to reset from said second position to said first position break said electrical connection in response to heat generated by said battery, thereby cutting-off supply of charging current to said battery set, and further comprising at least one permanent magnet arranged to retain said secondary battery set in said charging assembly until said thermo-setting member is reset upon charge saturation.

17. A charging device, comprising:

a charging assembly including at least two charging assembly contacts; and a secondary battery set including at least two battery set contacts;

wherein said at least two charging assembly contacts are arranged to engage said at least two battery set contacts, wherein at least one of said charging assembly contacts or battery set contacts is a thermo-resetting member, wherein when said secondary battery set is pushed into said recharging assembly are pushed together by an external force, said thermo-resetting member is pushed from a first position to a second position, said charging assembly and secondary battery set are electrically connected, and charging current is supplied from said charring assembly to said battery set, wherein at least one battery in said battery set generates heat when charged to saturation, wherein said thermo-resetting member is arranged to reset from said second position to said first position break said electrical connection in response to heat generated by said battery, thereby cutting-off supply of charging current to said battery set, and wherein said electrical connection is broken by disengaging one of said charging assembly contacts from one of said battery set contacts on one side of the charging assembly.

18. A charging device, comprising:

a charging assembly including at least two charging assembly contacts; and a secondary battery set including at least two battery set contacts;

wherein said at least two charging assembly contacts are arranged to engage said at least two battery set contacts, wherein at least one of said charging assembly contacts or battery set contacts is a thermo-resetting member, wherein when said secondary battery set is pushed into said recharging assembly are pushed together by an external force, said thermo-resetting member is pushed from a first position to a second position, said charging assembly and secondary battery set are electrically connected, and charging current is supplied from said charging assembly to said battery set, wherein at least one battery in said battery set generates heat when charged to saturation, wherein said thermo-resetting member is arranged to reset from said second position to said first position break said electrical connection in response to heat generated by said battery, thereby cutting-off supply of charging current to said battery set, and wherein said electrical connection is broken by disengaging both of said charging assembly contacts from both of said battery set contacts.

*19. A charging device for charging rechargeable batteries, comprising:*

*a power electric control device arranged to serve as a recharging power supply source;*

*at least two contacts including electrically-conductive negative and positive charging assembly contacts;*

*a thermally-driven spring structure; and*

*at least one auxiliary heater which is provided with electrical energy for generating heat while the rechargeable batteries reach saturation status;*

*wherein when said at least two contacts and input/output contacts of said rechargeable batteries are pushed together by an external force, said thermally-driven spring member is pushed from a first position to a second position, the rechargeable batteries are placed in a charging location device and held by the negative and positive charging assembly contacts, and electricity is conducted from the negative and positive charging assembly contacts to corresponding negative and positive input/output contacts,*

*wherein said auxiliary heater receives electric power and generates heat upon saturation of at least one of said rechargeable batteries,*

*wherein said thermally-driven spring structure is arranged to reset from said second position to said first position and push away said rechargeable batteries in response to heat generated by said auxiliary heater, thereby cutting-off or decreasing a supply of charging current to said rechargeable batteries.*

*20. A charging device as claimed in claim 19, wherein in the absence of the auxiliary spring structure, the rechargeable batteries held by the positive and negative charging assembly contacts of the charging device are placed in a prestressed position arranged such that the batteries release themselves from the charging location by gravitation force in case a holding force of the positive and negative charging assembly contacts decreases or ceases, and wherein the positive and negative charging assembly contacts are arranged to respond to heat from the auxiliary electric heater and separate the positive and negative charging assembly contacts from input/output battery contacts via thermally-induced displacement, thereby releasing the holding force on the rechargeable batteries and causing the rechargeable batteries to drop away from the charging device.*

* * * * *